(12) United States Patent
Hamed

(10) Patent No.: US 10,569,836 B2
(45) Date of Patent: Feb. 25, 2020

(54) AUTOMATIC BICYCLE SHIFTER AND CHAIN DRIVER

(71) Applicant: Hazem Nihad Hamed, Huntington Beach, CA (US)

(72) Inventor: Hazem Nihad Hamed, Huntington Beach, CA (US)

( * ) Notice: Subject to any disclaimer, the term of this patent is extended or adjusted under 35 U.S.C. 154(b) by 0 days.

(21) Appl. No.: 16/363,391

(22) Filed: Mar. 25, 2019

(65) Prior Publication Data
US 2019/0249769 A1 Aug. 15, 2019

(51) Int. Cl.
| | |
|---|---|
| B62M 25/08 | (2006.01) |
| F16H 61/02 | (2006.01) |
| B62M 9/122 | (2010.01) |
| B62M 9/132 | (2010.01) |
| F16H 63/42 | (2006.01) |
| F16D 41/30 | (2006.01) |
| F16H 59/66 | (2006.01) |
| F16H 59/44 | (2006.01) |

(52) U.S. Cl.
CPC ............ B62M 25/08 (2013.01); B62M 9/122 (2013.01); B62M 9/132 (2013.01); F16D 41/30 (2013.01); F16H 61/0213 (2013.01); F16H 63/42 (2013.01); *F16H 59/44* (2013.01); *F16H 59/66* (2013.01); *F16H 2059/663* (2013.01); *F16H 2061/0223* (2013.01)

(58) Field of Classification Search
CPC ............... B62M 25/00; B62M 25/008; B62M 2025/006; B62M 25/08; F16D 41/08; F16D 41/082; F16D 41/084
See application file for complete search history.

(56) References Cited

U.S. PATENT DOCUMENTS

| | | | | |
|---|---|---|---|---|
| 5,865,454 A * | 2/1999 | Campagnolo | .......... | B62M 25/08 280/238 |
| 7,306,531 B2 * | 12/2007 | Ichida | .................... | B62M 9/122 474/70 |
| 7,704,173 B2 * | 4/2010 | Ichida | .................... | B62M 25/08 474/80 |
| 7,874,567 B2 * | 1/2011 | Ichida | .................... | B62M 25/08 280/260 |
| 7,900,946 B2 * | 3/2011 | Hara | ...................... | B62M 9/122 280/260 |
| 9,394,030 B2 * | 7/2016 | Shipman | ................. | B62M 9/132 |
| 9,873,287 B2 * | 1/2018 | Emura | ................ | B60B 27/0031 |
| 10,252,772 B2 * | 4/2019 | Sala | ........ | B62K 23/06 |
| 2007/0207885 A1 * | 9/2007 | Watarai | .................. | B62M 25/08 474/70 |
| 2017/0008465 A1 * | 1/2017 | Kasai | ..................... | B62M 9/122 |
| 2017/0101161 A1 * | 4/2017 | Cohen | ................... | B62M 11/02 |
| 2018/0118211 A1 * | 5/2018 | Tsuchizawa | .......... | B60W 10/08 |

* cited by examiner

*Primary Examiner* — Michael C McCullough

(57) ABSTRACT

An automatic bicycle drivetrain shifting apparatus comprising a bicycle drive chain derailleur apparatus powered by a servo gearmotor and controlled through a highly adaptable user interface serving to automatically alternate drive chain position between available bicycle drive sprockets based on user preset and in real time modifiable criteria and additionally making use of critical chain driver apparatus serving to ensure chain motion is always available to satisfy derailleur operation requirements often prevalent during coasting and stopping where the bicycle speed changes while pedaling motion has ceased.

27 Claims, 24 Drawing Sheets

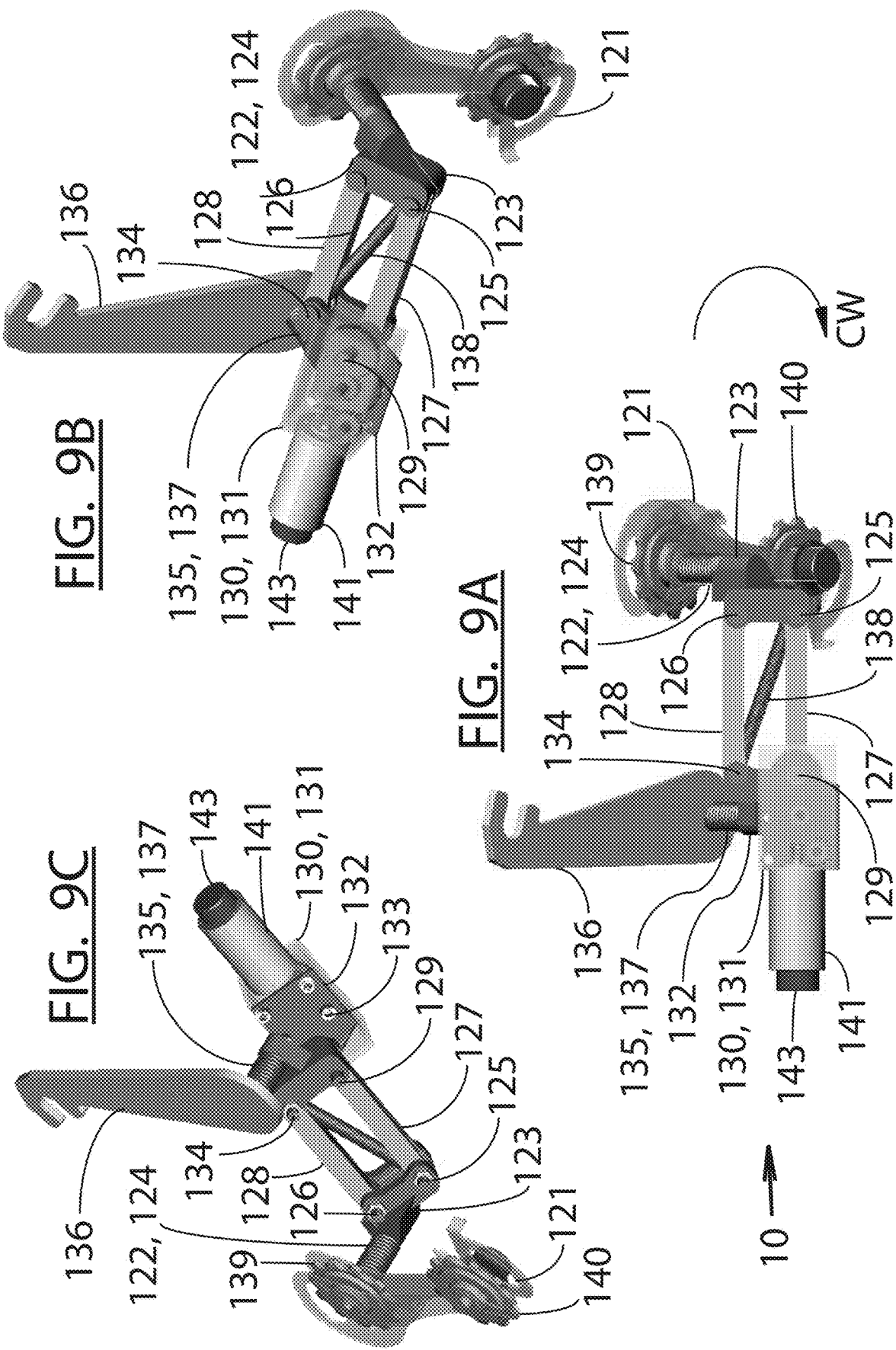

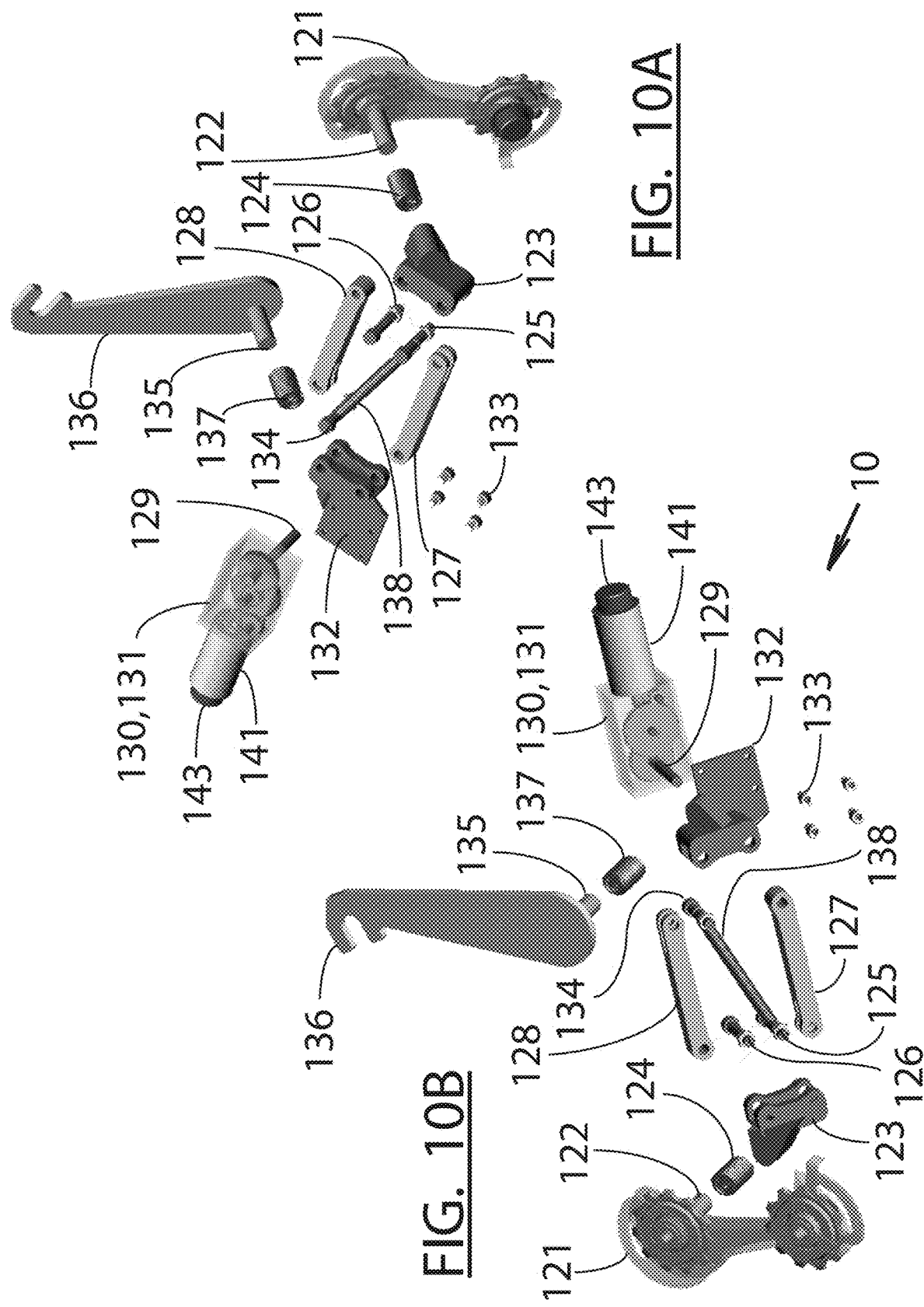

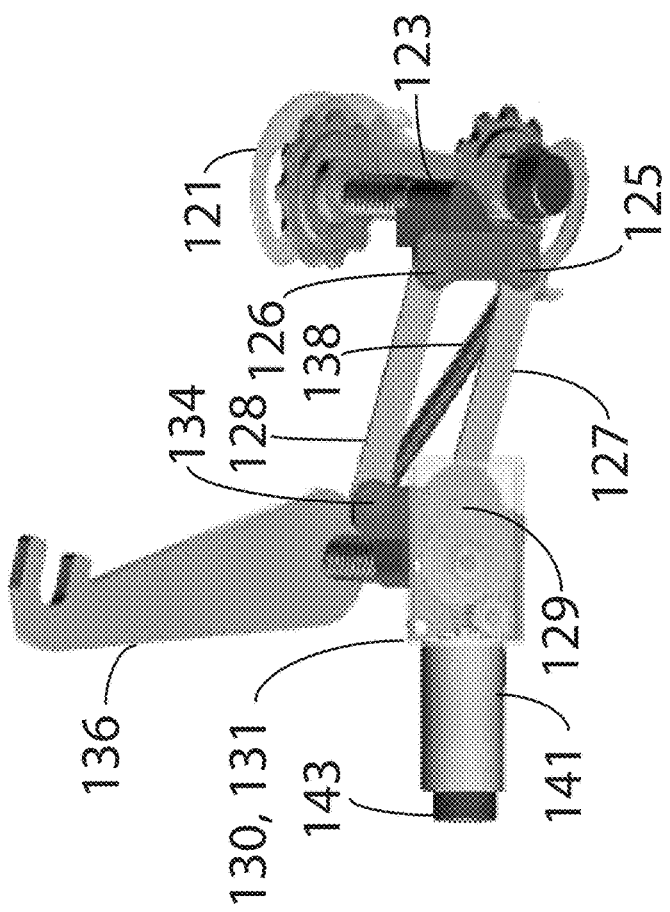
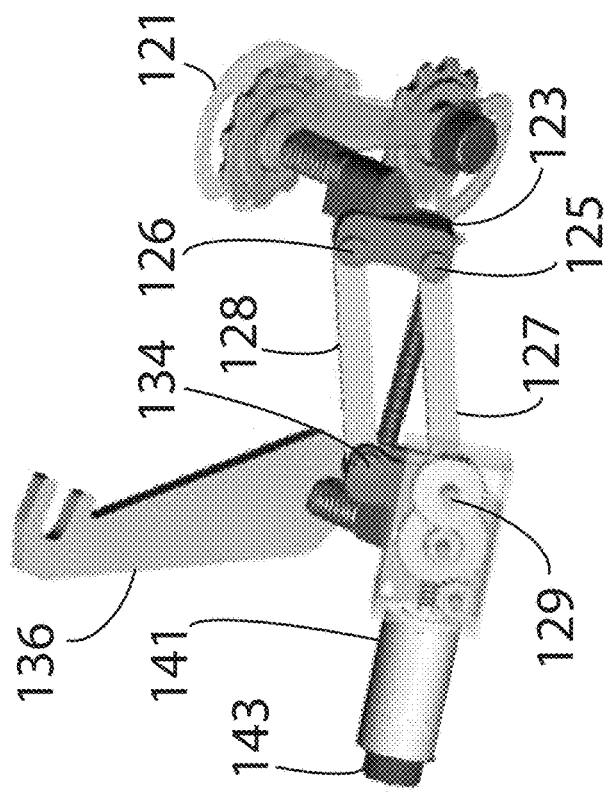
FIG. 11A
FIG. 11B

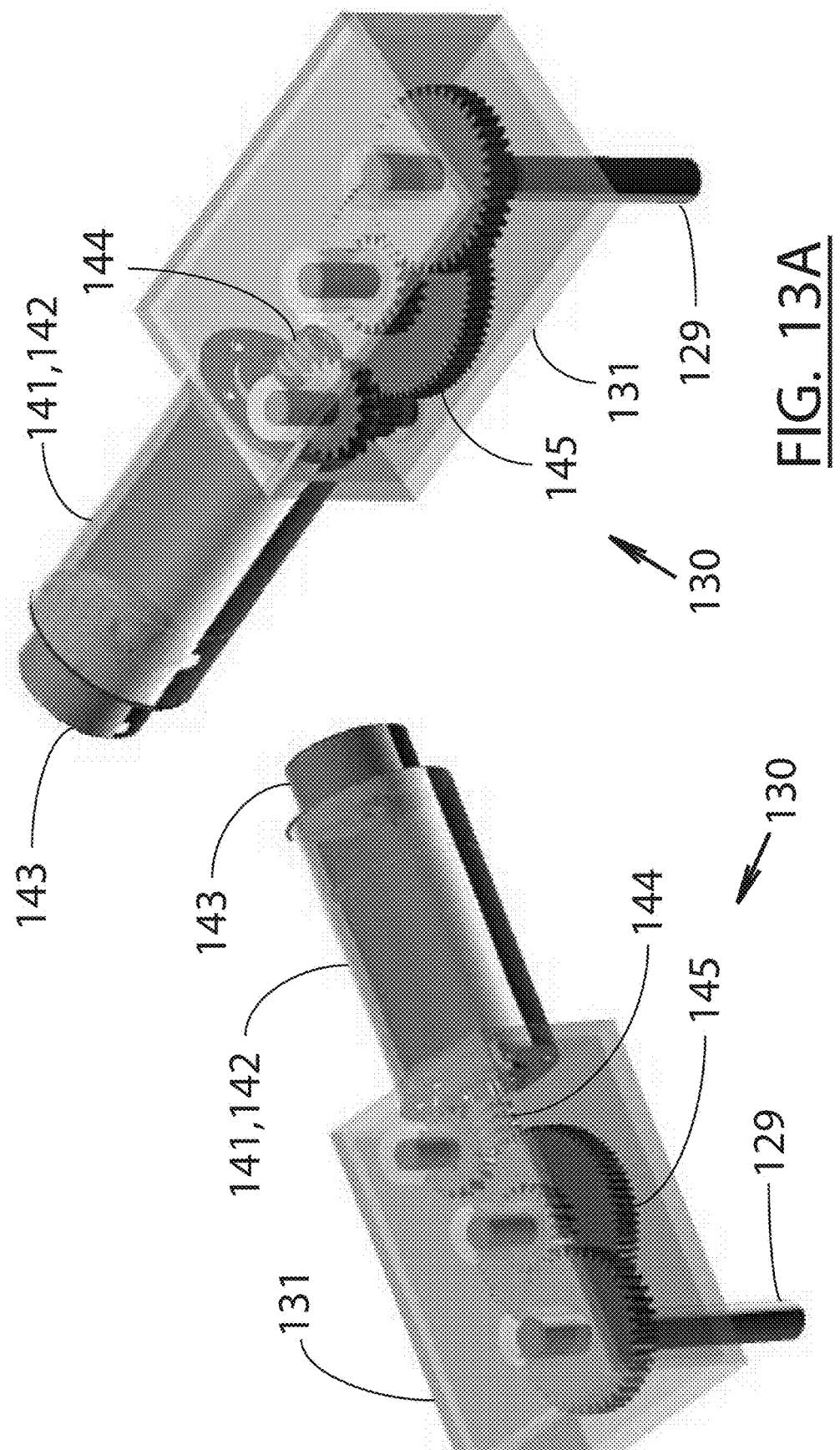

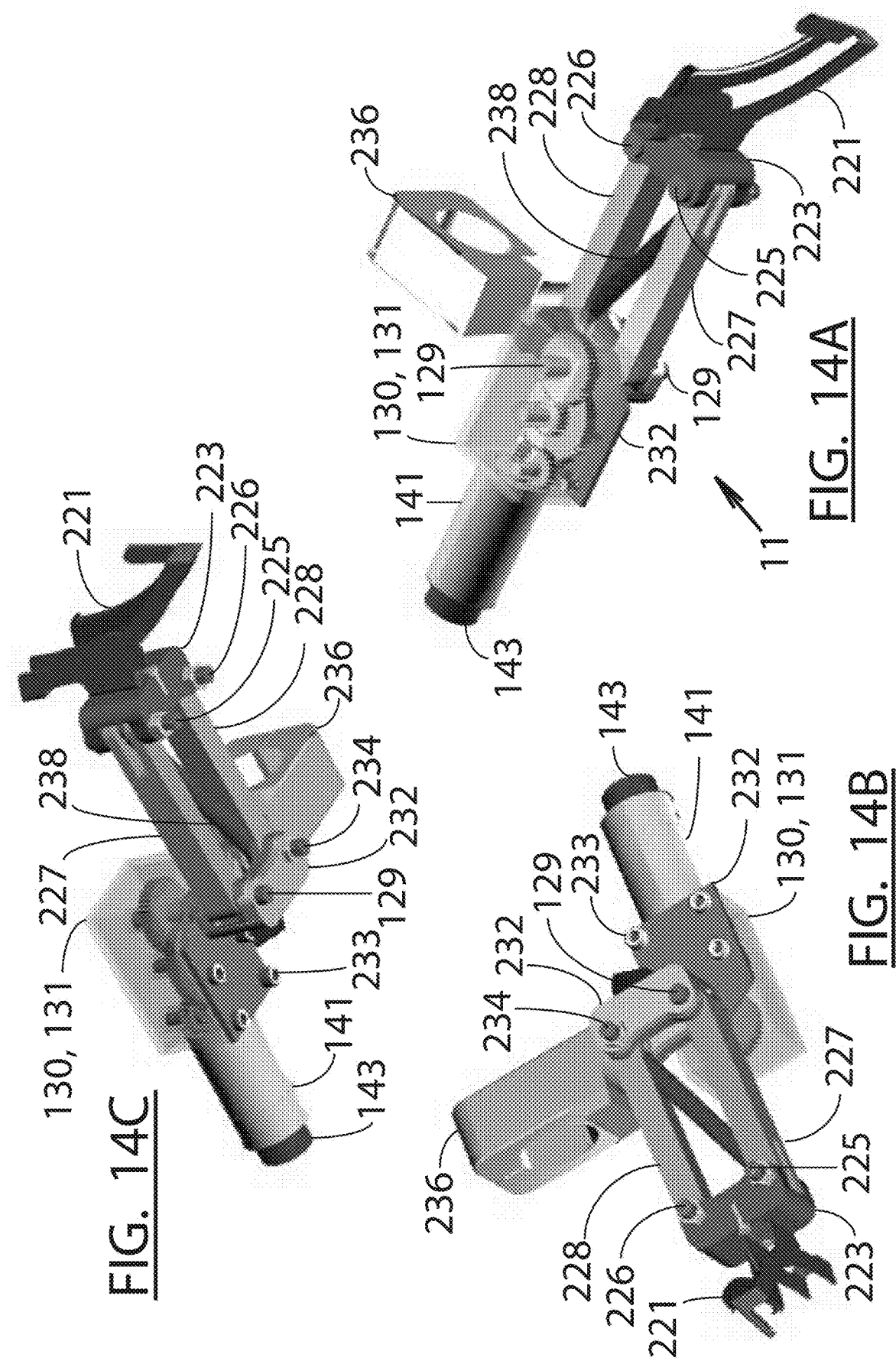

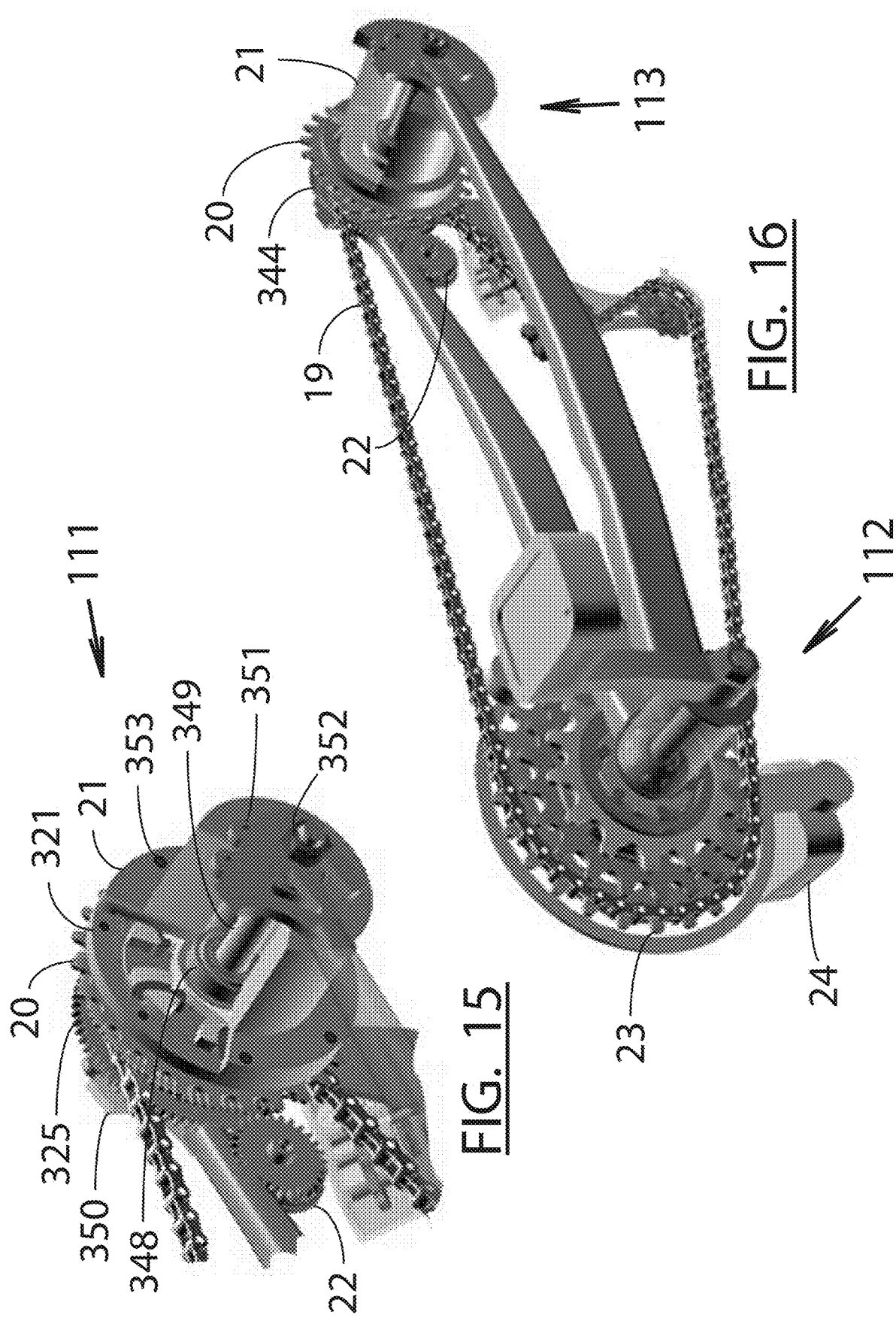

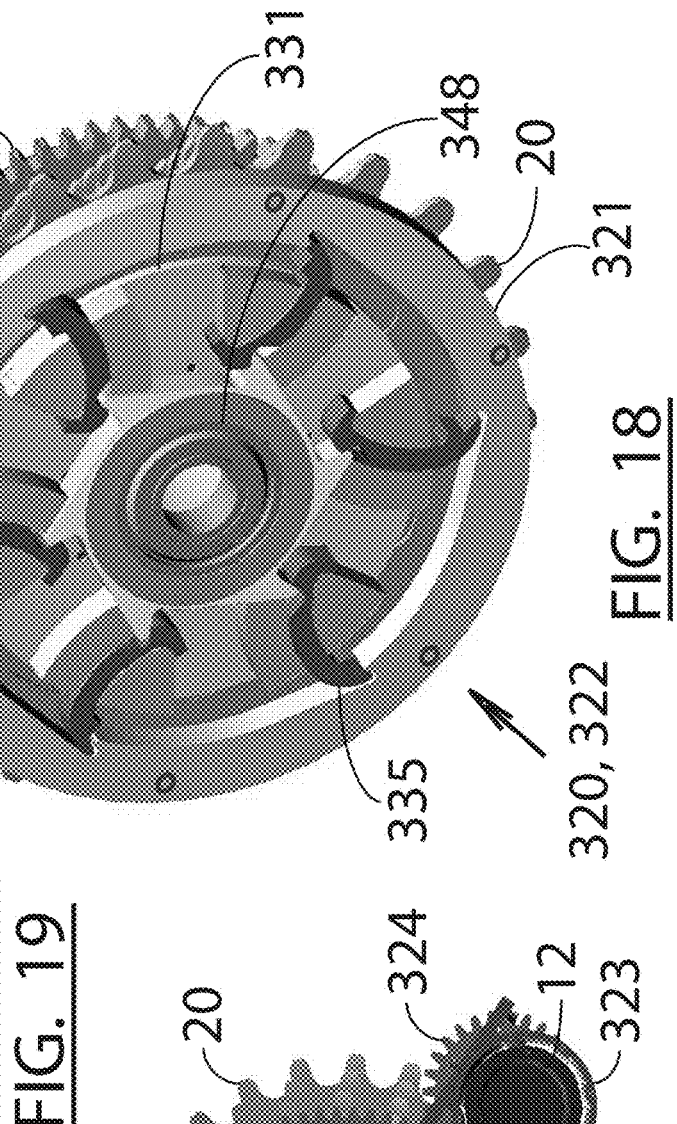
FIG. 18
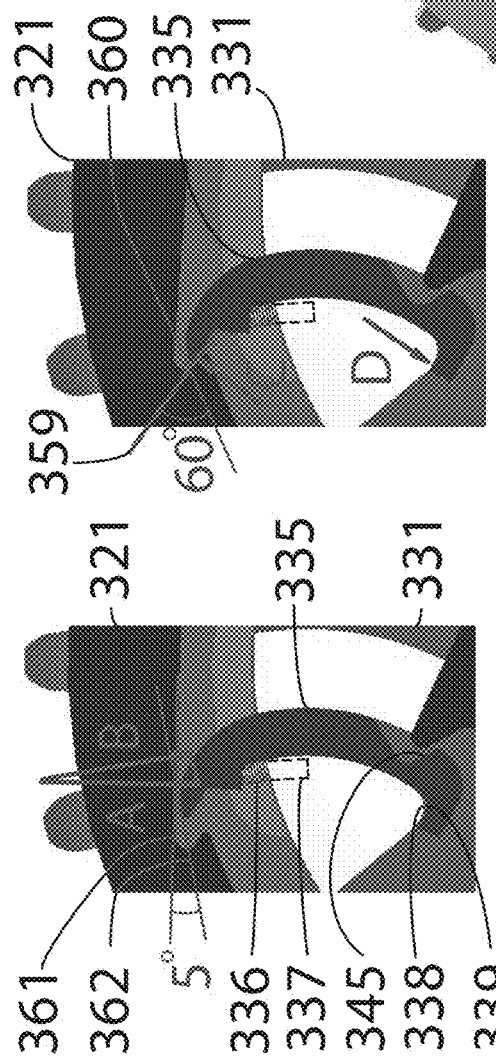
FIG. 19
FIG. 20
FIG. 21

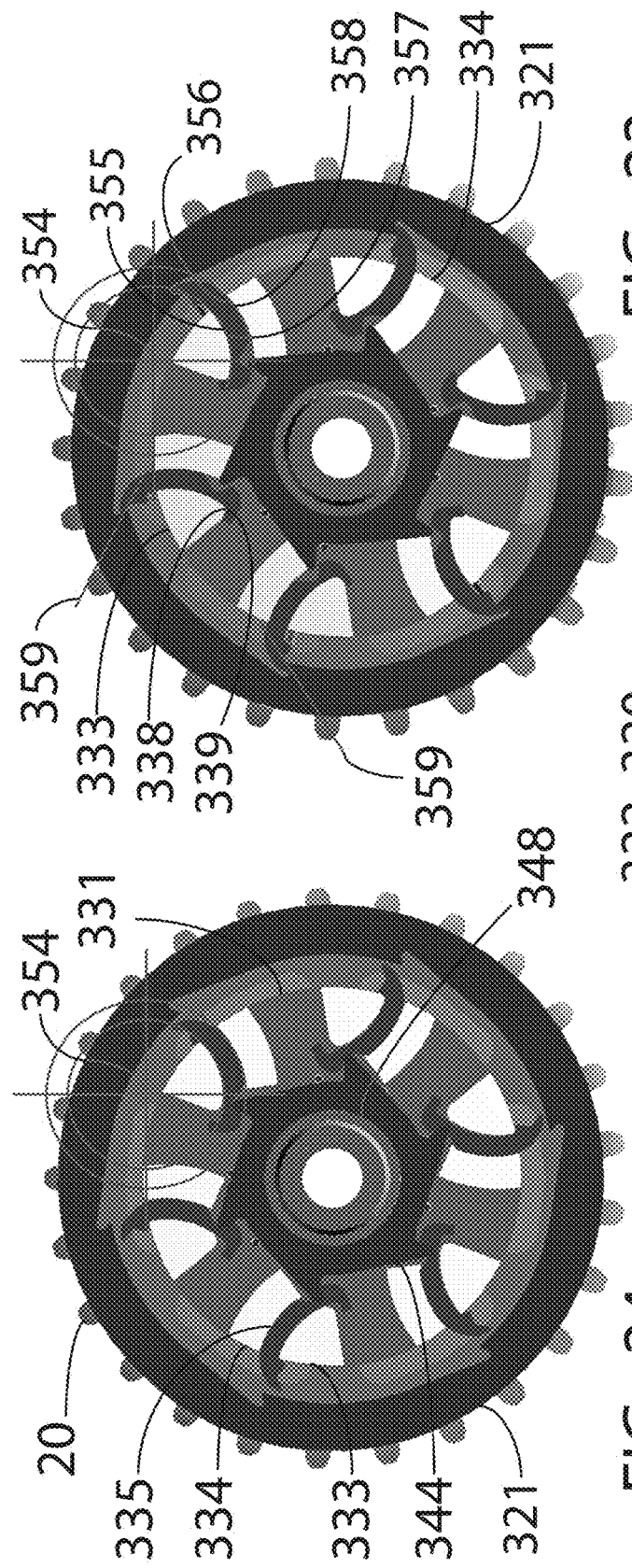
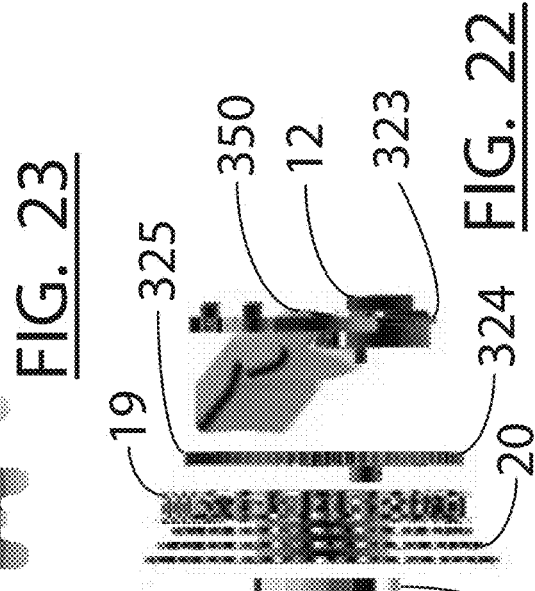
FIG. 23
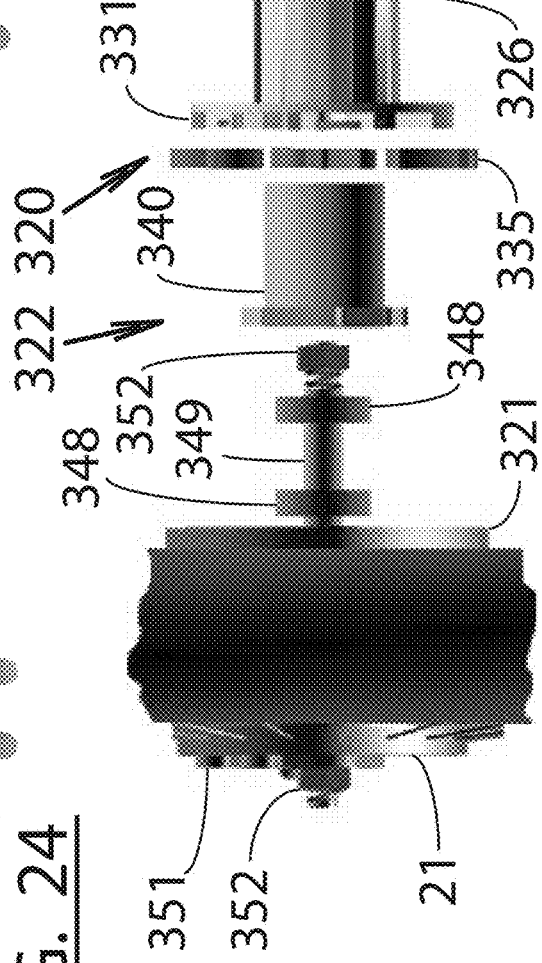
FIG. 24
FIG. 22

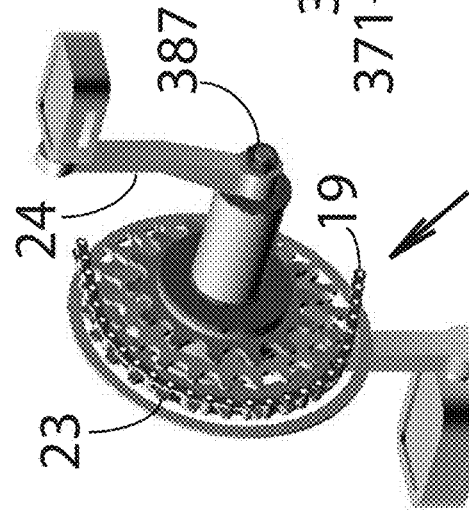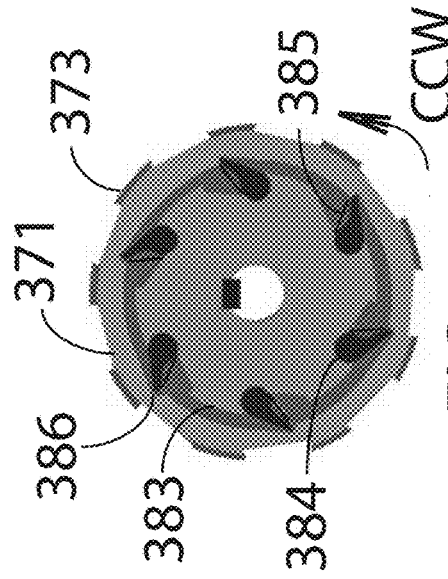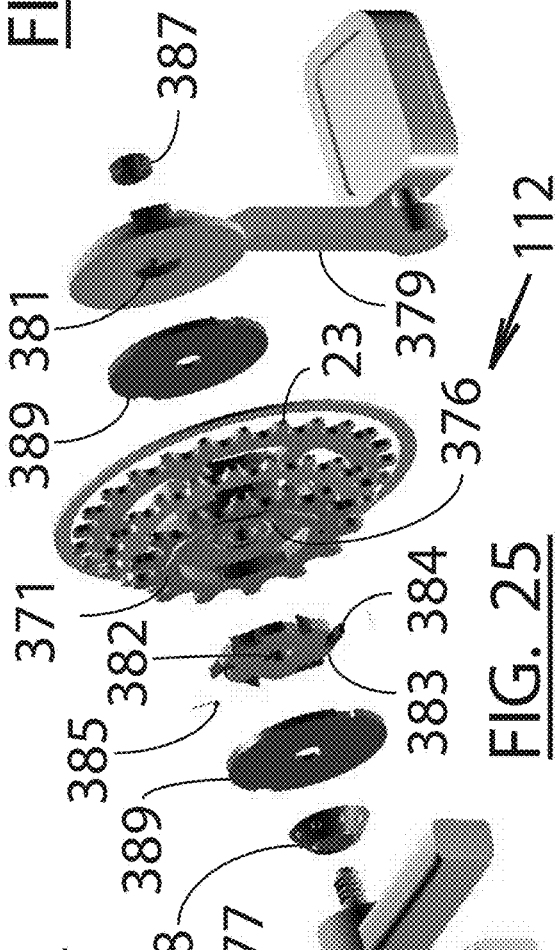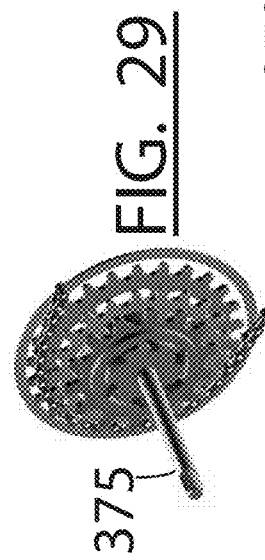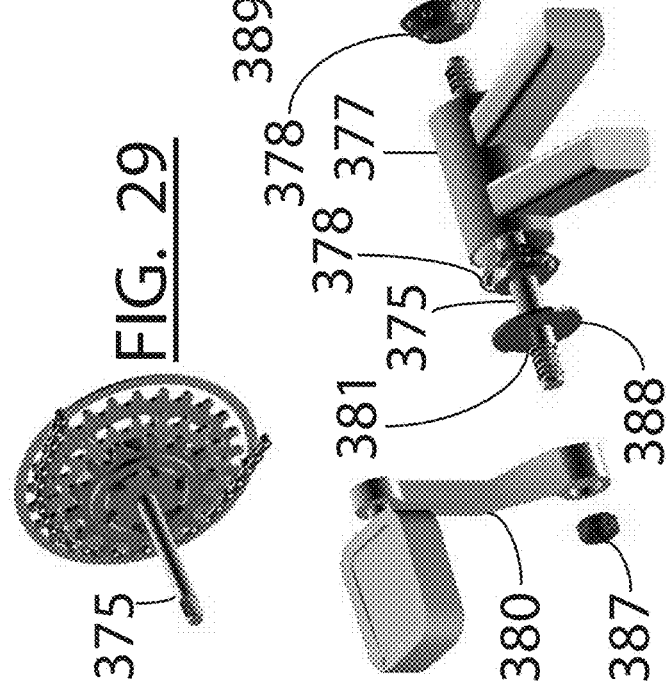
FIG. 26
FIG. 27
FIG. 25
FIG. 28
FIG. 29

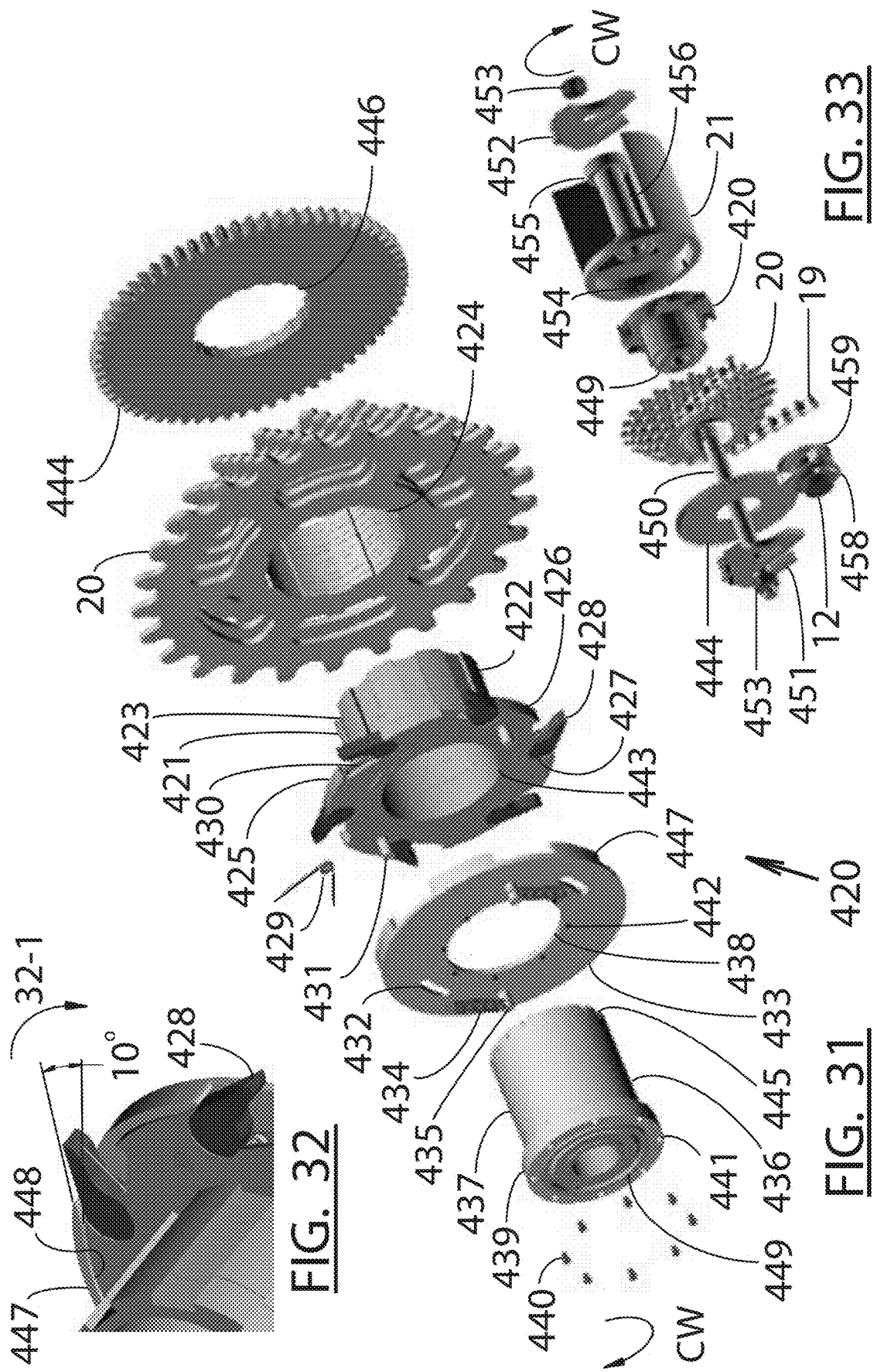

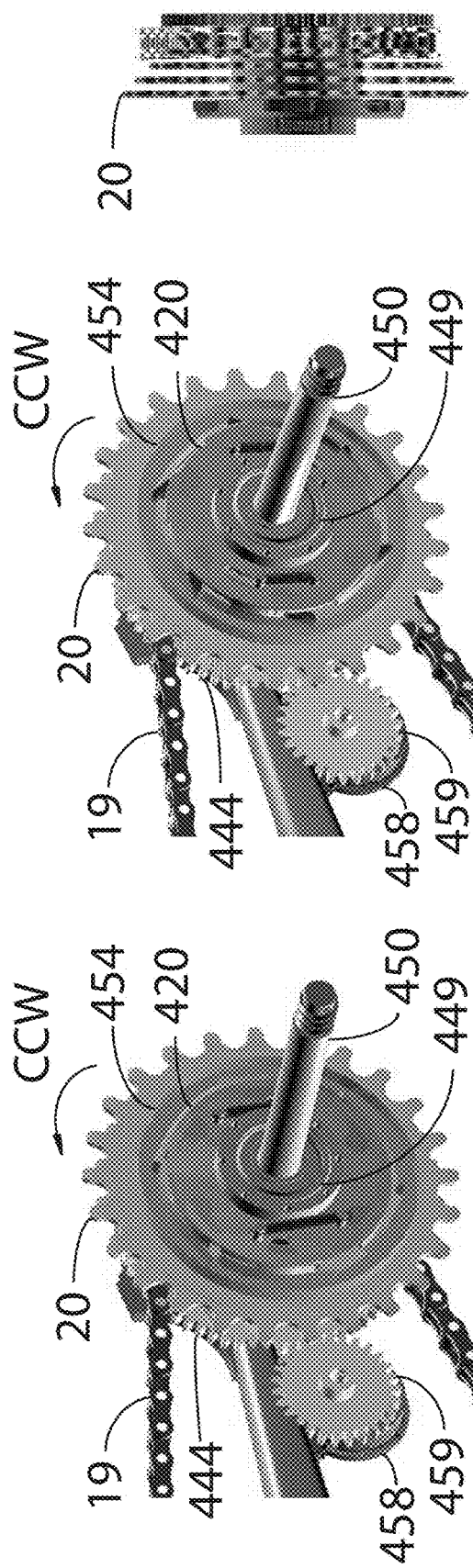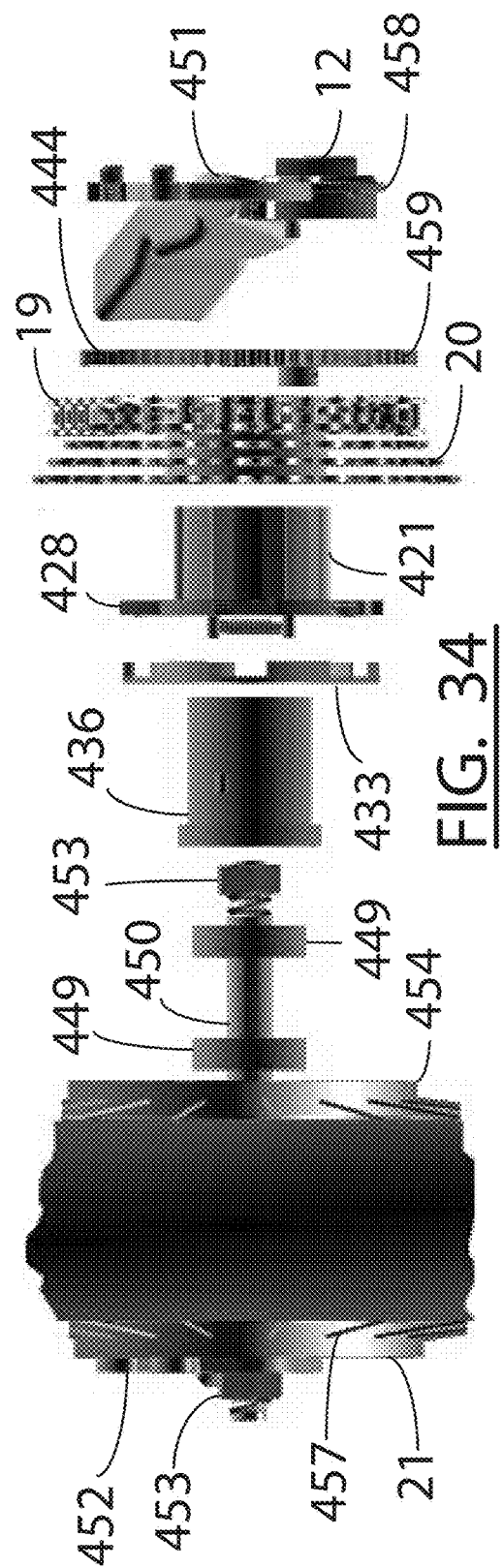

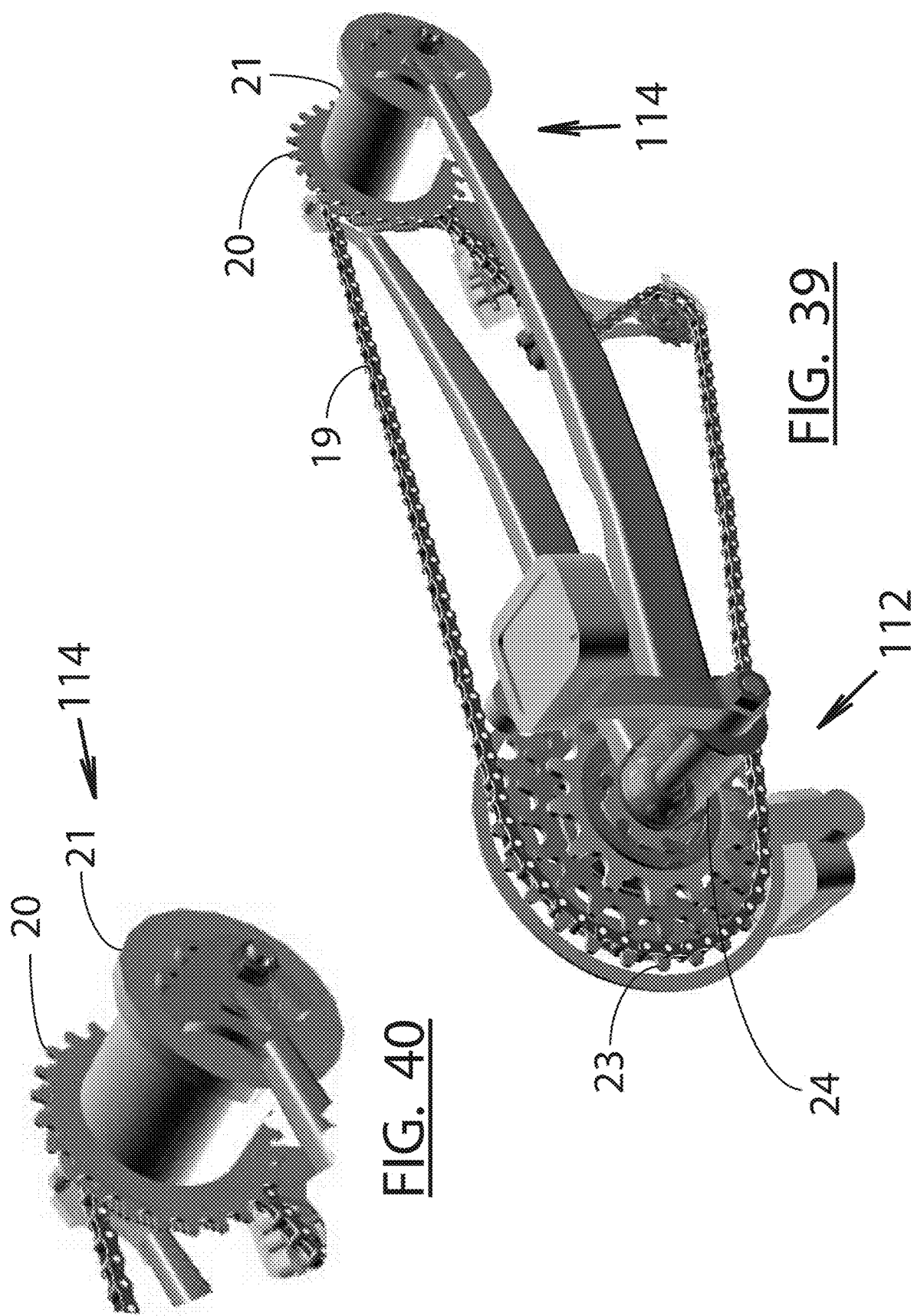

AUTOMATIC BICYCLE SHIFTER AND CHAIN DRIVER

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle designs typically making use of front and rear drive chain derailleurs serving to alternate drive chain position between different ratio front and rear drive sprockets through linkage to a set of rider control levers permitting the rider to achieve an optimal drivetrain ratio through selection of an adequate combination of front and rear drive sprockets, thereby facilitating a comfortable pedaling rate and effort thereof depending on desired road speed, rider conditioning, road inclination and other circumstantial conditions.

BACKGROUND OF THE INVENTION

Bicycles have existed for many years throughout serving as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or have to alternate the pedals at an uncomfortably high rate to achieve desired riding speed, a need was recognized for multiple powertrain ratios to facilitate acceptable operator pedaling rates and efforts. A variety of designs consequently evolved where additional power transmission sprockets of various number of teeth but equal pitch were added in the axial directions of the pedals mechanism as well as power transmission rear wheel to facilitate a combination of front and rear power transmission ratios resulting in optimal settings based on desired vehicle speeds, road conditions, operator biometrics and preference. This innovation was facilitated by the de-facto standard four bar linkage mechanism based derailleur assembly used to this very day to alternate drive sprockets through properly positioning the drive chain thereto as well as compensate for resultant varying chain lengths through an integral spring loaded chain tensioning mechanism. This capability was facilitated by two cable tensioning apparatuses, one for rear sprockets and another for the fronts. With one end of each cable apparatus connected to the derailleur chain positioning mechanism and the other end to an operator actuation mechanism typically comprising a lever assembly, these apparatuses granted the operator the ability to alternate the chain position in the axial position for proper alignment and thereby engagement of selected rear and front drive sprockets in order to achieve optimal power transmission ratio settings. Advancements in the actuation mechanism included indexing capability of the operator lever assembly so that the actuation of the derailleur mechanism takes place in an indexing fashion consistently properly aligning the chain with desired sprocket thereof rather than one continuous motion requiring the operator to guess the proper chain position often leading to positioning errors.

As the technology to provide the desired function of automating the manual shift operation of the bicycle has existed for years, numerous attempts have been made to provide a robust yet commercially successful product. Some were attempts sacrificing robust componentry for cost, tight packaging and commerciality, in the process adding extraneous components such as springs and levers to prevent premature failure, while others were based on complex mathematical or fixed criteria based on "One for All" approaches. On the fundamental level most failed to recognize the basic limitation of the legacy shifter mechanism inability to shift less chain motion. With such conditions arising during coasting, braking or downhill descent where the operator ceases to operate the pedals, these numerous attempts managed to ultimately achieve varying levels of success but uniformly fell short of meeting widespread commercial acceptance. On the fundamental level, most of these offerings had in common the failure to recognize that acceptance of these various designs ultimately boiled down to adaptability by a user population widespread in biometrics, endurance, strength and size.

The inventor hereby discloses a versatile automatic bicycle shifter making use of servo motors, a robust microprocessor based control system making use of various speed, chain movement and road inclination sensors, a highly adaptable user interface making use of a set of operator predefined and in real time adjustable criteria, and additionally making use of a chain driver apparatus ensuring forward chain motion is available to permit unconditional operation of derailleurs, is used to place the powered shifter mechanism in an optimal position on a consistent basis in order to provide a more pleasurable and comfortable experience for the rider thereby consistently achieving acceptable pedaling rates and efforts based on the ever changing need of the rider.

DISCUSSION OF PRIOR ART

The following is a brief summary of prior art deemed pertinent to the automatic bicycle shifter and chain driver of the present invention.

U.S. Pat. No. 9,234,580 discloses a control device for a bicycle automatic transmission comprising an entailed computation algorithm based traveling resistance computed through readings of torque measurements, cadence or pedaling rate, bicycle speed and mass of bicycle and rider. As this approach is fundamentally based on assuming that two riders with the same weight but with significantly different muscles to fat ratios have synonymous abilities, the end result that this approach is likely to yield seems to be less than optimal. This disclosure, additionally falls short of providing a bicycle shifting criteria highly adaptable by the rider devoid of any complex mathematical calculations destined to fall short of providing riders an adequate result.

U.S. Pat. No. 8,977,450 identifies a bicycle derailleur shifting apparatus making use of a pedal crank angle sensor to calculate optimal shift timing. This disclosure is based on the assumption that a great effort is needed post the actual sprocket shift taking place such as in premature shifting requiring the rider to exert undue effort while in fact a properly timed automatic shifter will conduct this action when the bicycle speed has reached a threshold defined by the rider, where the post shift pedaling effort is acceptable.

With the outlined sifting action solely based on a pedals crank angle sensor, disclosure does not seem to define a cooperating and functional system. Being very limited in nature, outlined approach would be best applied to an existing comprehensive bicycle automatic gear shifting apparatus.

U.S. Pat. No. 8,900,087 outlines a disclosure for an automatic bicycle shifting apparatus based on a mechanical governor where centrifugal force due to wheel speed results in planetary gear changes. Although this disclosure could very well result in an operable system, shift settings are solely a function of bicycle speed thereby ignoring rider biometrics, road conditions and personal preferences at the time the actual riding is taking place in the process likely falling short of preference and capability of the rider.

U.S. Pat. No. 8,512,182 details an intricate mechanical automatic bicycle shifting apparatus based on mechanical torque measurements with operator strength selectable criteria. As is the case with most mechanical devices shift action is mostly preset depriving the rider from making changes in real time without stopping. The sheer complexity of the outlined design comprising levers springs, weights, etc., is likely to prove less reliable as well as less user friendly than other simpler designs making use of electronics to produce desired optimal result for the rider.

U.S. Pat. No. 7,892,122 B2 and Reissue U.S. Pat. No. RE41,782 summarize a complex derailleur arrangement making use of torsion spring to permit shifting less bicycle chain motion. Clearly, this provision is intended to overcome the great constraint placed on this design by confining the derailleur motor along with reduction gearing to a small housing. As a shift operation less any chain motion sensors confirming shift action is possible, is likely to prove detrimental to this confined and prone to overheating motor, attempt have been made for the derailleur to reach intended position during shift notwithstanding lack of chain motion so that applied power would cease short of burning the small motor windings thereof. It is noteworthy though, to indicate that this problem does not resolve the shortcoming of the legacy derailleur of not being able to shift less chain motion, this approach simply attempt to overcome the aforementioned challenge inherent to the legacy shifter design. An LCD screen is offered along with manual shift up and down switches as well as with another switch to alternate between manual and automatic shift operation. Without taking into account road conditions and operator preference and granting the rider ability to make changes on the fly without stopping, this disclosure, although a substantial improvement of preceding art, still falls short of providing the rider with an acceptable system with ability to instantaneously achieve desired optimal riding settings with ease.

U.S. Pat. No. 7,467,567 B2 outlines a highly special gearing reduction apparatus for an electrically powered bicycle derailleur where the motor along with reduction gearing has been confined to a small housing. This patent seems to be an earlier attempt to that outlined in U.S. Pat. No. 7,892,122 and therefore suffers the same limitations of using an undersized drive motor in order to fit within the packaging constraint thereof. Heat dissipation upon extended effort cycles is likely to become an issue making this design more prone to failure. Amongst other concerns with this approach, is the highly specialized componentry and greatly diminished serviceability aspects of this design.

U.S. Pat. No. 7,247,108 defines a microprocessor based automatic bicycle derailleur shifting method based on a simplistic logical algorithm for derivation of an adequate combination between front and rear sprockets determined by the inventor to be an adequate approach. Along with prior reasoning, a device that applies across a spectrum spanning from a $50^{th}$ percentile female and a $90^{th}$ percentile male without offering the rider meaningful means to adjust to own riding preference, is essentially guaranteed to produce the unwanted result where the rider has to pedal too fast with too little effort or instead too slow with too much effort. It is also noteworthy that the inventors of this device did recognize the need to include a user interface into their design. An LCD screen is offered for the rider with manual shift up and down switches along with another switch to alternate between manual and automatic shift operation. Therefore, it is evident that the inventor recognized that the rider would need to get around the automatically computed shift selection of this approach, at least some of the time.

U.S. Pat. No. 6,997,835 B2 discloses a bicycle electrically powered rear derailleur with compliance means for storage of energy so that actuation thereof takes place as needed notwithstanding lack of necessary forward chain motion required by the legacy four bar linkage shifter design. As such an approach alleviates potential motor overheating conditions due to lack of necessary forward chain motion necessary for the derailleur to reach intended position, the seek position of the shift motor is nevertheless achieved with compliance means storing the shifting energy. Important to note that this does not solve the problem of the device being in the wrong setting after stopping, the sole advantage of this invention is relieving the derailleur motor of excess work and thereby minimizing any chances of overheating. It is also worthwhile to note that this additionally places an undesirable side load on the drive chain. Moreover, lack of highly desirable accuracy of the position held by the derailleur since reaction by a mechanical spring is typically proportionate to displacement so that the derailleur final settling position, although typically close, is nevertheless never reached due spring hysteresis and offset by the encountered resistance by the chain and mechanical friction within the derailleur linkage.

U.S. Pat. No. 5,480,356 discloses an electrically powered derailleur where the legacy spring has been replaced with a highly special linear actuator making use of a planetary gearset. It is clear based on the geometry of this invention as outlined in respective art that a major component of the force of the linear actuator is going into thrust in one of the joints while the force component serving to produce the actual shifting action is miniscule. Aside from realizing highly detrimental forces to joint bearings, this approach in turn requires greatly oversizing the actuator to realize an acceptable force output leading to a very costly linear actuator highly prone to failure.

Notwithstanding the long sought after successful design for alleviating the bicycle rider from the demanding task of continually seeking an acceptable shift setting, an effective and rider highly adaptable solution to this challenging problem, as can be seen from outlined art, has proven highly elusive. Lack of disclosed art along with lack of commercially successful and thereby available products facilitating automatic and highly adaptable shifting criteria for the rider is further evidence to the absence of a bicycle automatic shifter, controls and user interface means with these highly desirable characteristics.

BRIEF SUMMARY OF THE INVENTION

Inventor discloses means for achieving the highly desirable option of relieving the bicycle rider of the drivetrain shifting task through equipping the bicycle shifter mechanism with a servo power actuation device governed by a microprocessor based electronic control system comprising bicycle speed and road condition sensors to proactively manage in real time engagement of suitable front and rear drive sprockets based on operator preset criteria resulting in an optimal and automatically selected drive operation ratio in order to facilitate acceptable pedaling rates and efforts.

The preferred embodiment of the automatic bicycle shifter of the present invention comprises a novel actuation mechanism powered by a servo electric motor coupled to a high gearing ratio reducer making use of worm and spur or helical teeth gearing with output shaft pivotally affixed to one of actuation links of chain positioning four bar linkage serving to accurately position drive chain guiding idler sprockets cage assembly and consequently positioning of slaved bicycle drive chain in precise predefined positions of alignment with specific drive sprockets, and slaving said actuation mechanism thereof to a comprehensive microprocessor based controls system comprising a bicycle speed sensor, an inclinometer, and motor power amplifiers serving to drive said actuation servo motor under microprocessor command thereby facilitating automatic bicycle drive powertrain shifting for the operator based on preset and continually available setting criteria presented to the rider through a user friendly interface.

As rider comfort is a continually moving target based on the rider condition often governed by traveled distance, conditioning, road and weather conditions, predefined and fixed shift criteria become simply unacceptable. Consequently, a user interface facilitating means to continually adjust the bicycle shifting criteria with ease is offered in order to successfully realize the intended function of the invention. Emphasis is thereby placed on tailoring the user interface to rider condition in real time by providing slide touch controls realizing ability to proportionately or in a user predefined relationship adjust shifting thresholds up or down. As road inclination comes into play as well, another sliding touch control is provided for user to adjust programmed shifting thresholds attenuation due to road inclination in real time. Ability to switch to manual is yet another option that the user might result to under certain circumstances so this functionality is also offered by the novel user interface of this invention.

A fundamental limitation to all derailleurs of the de-facto design universally utilized in the industry and all its derivatives, including the novel derailleur mechanism of the automatic bicycle shifter of the present invention, is the requirement for forward chain motion to be present in order for the derailleur assembly to be able to alternate chain sprockets. This condition arises anytime the bicycle rider ceases to operate the pedals while the bicycle is in motion and undergoing either acceleration or deceleration, either due to coasting or hard braking or during instances where the bicycle is rolling downhill a steep enough slope. The bicycle speed crosses a speed changing threshold requiring the derailleur to alternate sprockets but is unable to do so due to lack of forward chain motion thereof. The novel solution being disclosed by the inventor to overcome this limitation is a set of different designs for a novel chain driver mechanism providing forward chain motion as required by the derailleur for shifting action when the rider has ceased to operate the pedals.

The preferred embodiment of the novel chain driver of the automatic bicycle shifter of the present invention comprises a small electrical motor serving to initiate forward motion of rear wheel sprockets post decoupling the rear wheel ratchet assembly resulting in consequential forward chain motion permitting either front or rear derailleur or both to alternate. The chain driver preferred embodiment additionally includes a pedals ratchet mechanism serving to decouple the pedals assembly to prevent inadvertent actuation thereof due to forward chain motion.

An alternate embodiment of the chain driver of the automatic bicycle shifter of the present invention employing an alternate decoupling apparatus for the rear wheel ratchet assembly but making use of the same pedals decoupling ratchet mechanism is presented as another solution to the automatic bicycle shifter of the present invention.

Also disclosed is another alternate embodiment of the chain driver of the automatic bicycle shifter of the present invention based on total elimination of the rear wheel ratchet assembly but making use of the same aforementioned pedals ratchet assembly ensuring forward chain motion being always present during bicycle forward motion and is thereby presented, notwithstanding placing more stringent requirements on the controls, as a simpler chain driver solution with less components.

The preferred and alternate embodiments of the chain driver are applicable to both rear and front derailleurs of the preferred embodiment of the automatic bicycle shifter of the present invention as well as to rear and front derailleurs of the alternate embodiment of the automatic bicycle shifter of the present invention.

BRIEF DESCRIPTION OF THE DRAWINGS

FIG. 9A is a top perspective view of the rear derailleur of the preferred and alternate embodiments of the automatic bicycle shifter and chain driver of the present invention.

FIG. 9B is an oblique perspective view of the rear derailleur of the preferred and alternate embodiments of the automatic bicycle shifter and chain driver of the present invention.

FIG. 9C is a bottom perspective view of the rear derailleur of the preferred and alternate embodiments of the automatic bicycle shifter and chain driver of the present invention.

FIG. 10A is an oblique exploded view of the rear derailleur of the preferred and alternate embodiments of the automatic bicycle shifter and chain driver of the present invention.

FIG. 10B is an exploded view of the rear derailleur of the preferred and alternate embodiments of the automatic bicycle shifter and chain driver of the present invention taken from the opposite direction of FIG. 10A.

FIG. 11A is a top perspective view of the rear derailleur of the preferred and alternate embodiments of the automatic bicycle shifter and chain driver of the present invention in extreme extended position.

FIG. 11B is a top perspective view of the rear derailleur of the preferred and alternate embodiments of the automatic bicycle shifter and chain driver of the present invention in extreme retracted position.

FIG. 13A is an oblique perspective view of the servo gearmotor employed in the front and rear derailleurs of the preferred and alternate embodiments of the automatic bicycle shifter and chain driver of the present invention.

FIG. 13B is an oblique perspective view of the servo gearmotor employed in the front and rear derailleurs of the preferred and alternate embodiments of the automatic bicycle shifter and chain driver of the present invention taken from an opposite direction of FIG. 13A.

FIG. 14A is a top perspective view of the front derailleur of the preferred and alternate embodiments of the automatic bicycle shifter and chain driver of the present invention.

FIG. 14B is a bottom perspective view of the front derailleur of the preferred and alternate embodiments of the automatic bicycle shifter and chain driver of the present invention taken from an opposite direction of FIG. 14A.

FIG. 14C is an oblique bottom perspective view of the front derailleur of the preferred and alternate embodiments of the automatic bicycle shifter and chain driver of the present invention.

FIG. 15 is a perspective cutaway view of the preferred embodiment of the chain driver of the present invention.

FIG. 16 is a perspective view of the systems and components comprising the first alternate embodiment of the chain driver of the automatic bicycle shifter and chain driver of the present invention.

FIG. 18 is a perspective assembly view of the preferred embodiment of the chain driver of the automatic bicycle shifter and chain driver of the present invention.

FIG. 19 is a partial plan view of the preferred embodiment of the chain driver of the automatic bicycle shifter and chain driver of the present invention depicting resultant force and reaction in engagement position.

FIG. 20 is a partial plan view of the preferred embodiment of the chain driver of the automatic bicycle shifter and chain driver of the present invention depicting resultant force and desirable pawl collapse component in slip position.

FIG. 21 is a rear view depicting the chain driver motor and gearing of the preferred embodiment of the chain driver of the automatic bicycle shifter and chain driver of the present invention.

FIG. 22 is a side exploded view of the rear hub assembly of the preferred embodiment of the chain driver of the automatic bicycle shifter and chain driver of the present invention.

FIG. 23 is a plan view of the preferred embodiment of the chain driver of the automatic bicycle shifter and chain driver of the present invention with the pawl cam assembly in disengaged position.

FIG. 24 is a plan view of the preferred embodiment of the chain driver of the automatic bicycle shifter and chain driver of the present invention with the pawl cam assembly in engaged position.

FIG. 25 is an exploded view of the pedals assembly of the preferred and alternate embodiments of the chain driver of the automatic bicycle shifter and chain driver of the present invention.

FIG. 26 is an exploded view of the pedals sprockets assembly of the preferred and alternate embodiments of the chain driver of the automatic bicycle shifter and chain driver of the present invention.

FIG. 27 is a perspective view of the pedals assembly of the preferred and alternate embodiments of the chain driver of the automatic bicycle shifter and chain driver of the present invention.

FIG. 28 is a plan view of the pedals ratcheting assembly of the preferred and alternate embodiments of the chain driver of the automatic bicycle shifter and chain driver of the present invention in engaged position.

FIG. 29 is perspective view depicting internal construction of the pedals assembly of the preferred and alternate embodiments of the chain driver of the automatic bicycle shifter and chain driver of the present invention.

FIG. 31 is an exploded view of the systems and components comprising the first alternate embodiment of the chain driver of the automatic bicycle shifter and chain driver of the present invention.

FIG. 32 is a partial perspective view depicting critical geometric feature of the pawl cam assembly of the first alternate embodiments of the chain driver of the automatic bicycle shifter and chain driver of the present invention.

FIG. 33 is an exploded view of the rear hub assembly of the first alternate embodiment of the chain driver of the automatic bicycle shifter and chain driver of the present invention.

FIG. 34 is an exploded side assembly view of the rear hub of the first alternate embodiment of the chain driver of the automatic bicycle shifter and chain driver of the present invention.

FIG. 35 is a partial end view of the first alternate embodiment of the chain driver of the automatic bicycle shifter and chain driver of the present invention.

FIG. 36 is a perspective view of the first alternate embodiment of the chain driver of the automatic bicycle shifter and chain driver of the present invention with the pawl ratchet assembly in engaged position.

FIG. 37 is a perspective view of the first alternate embodiment of the chain driver of the automatic bicycle shifter and chain driver of the present invention with the pawl ratchet assembly in disengaged position.

FIG. 39 is a perspective view of the systems and components comprising the second alternate embodiment of the chain driver of the automatic bicycle shifter and chain driver of the present invention.

FIG. 40 is a partial perspective view of the second alternate embodiment of the chain driver of the automatic bicycle shifter and chain driver of the present invention.

DETAILED DESCRIPTION OF THE INVENTION

Figure 1:
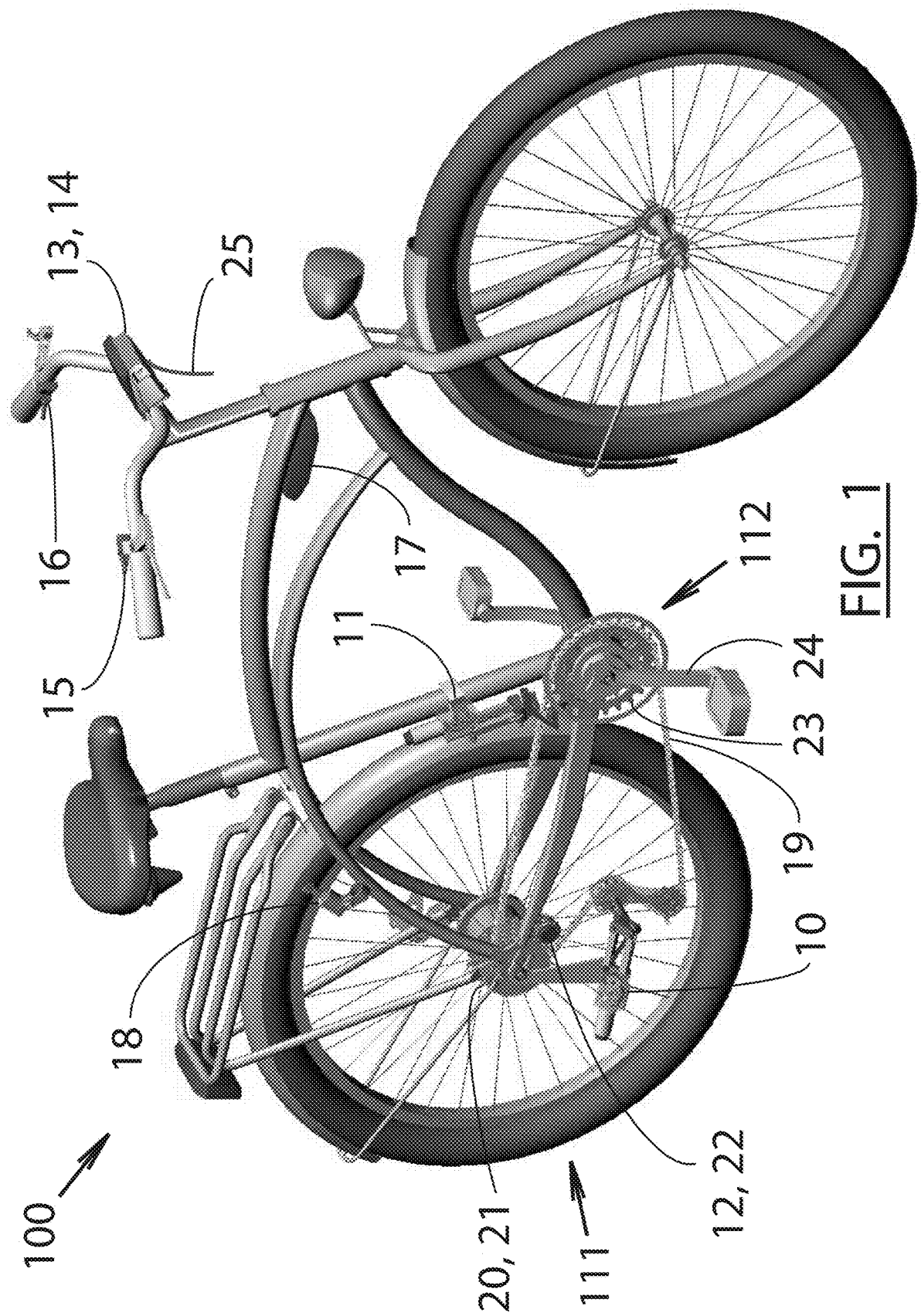
FIG. 1 is an overall view of the systems and components comprising the preferred embodiment of the automatic bicycle shifter and chain driver of the present invention.
Figure 2:
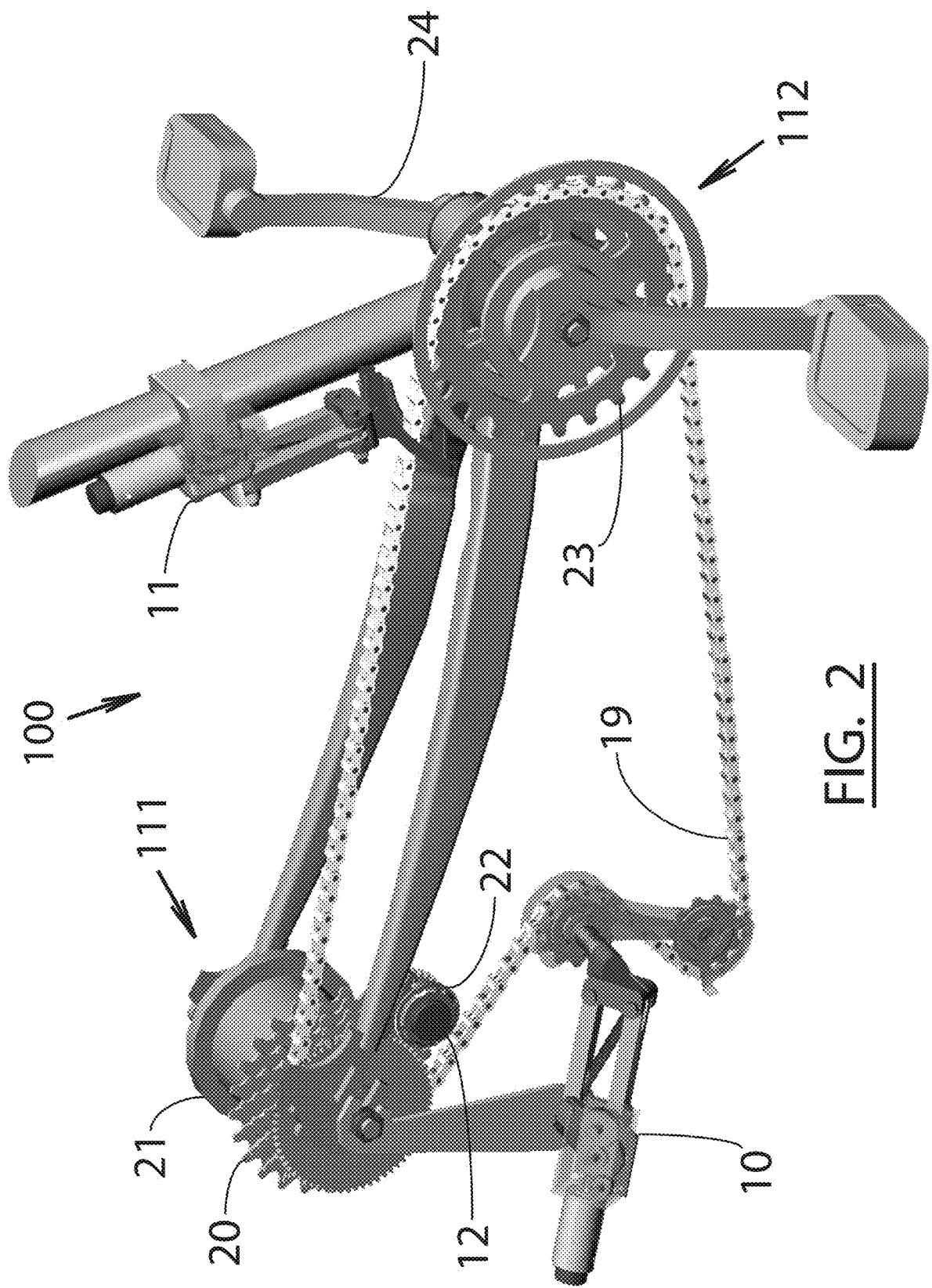
FIG. 2 is a perspective view of the powertrain of the preferred embodiment of the automatic bicycle shifter and chain driver of the present invention.
Figure 3:
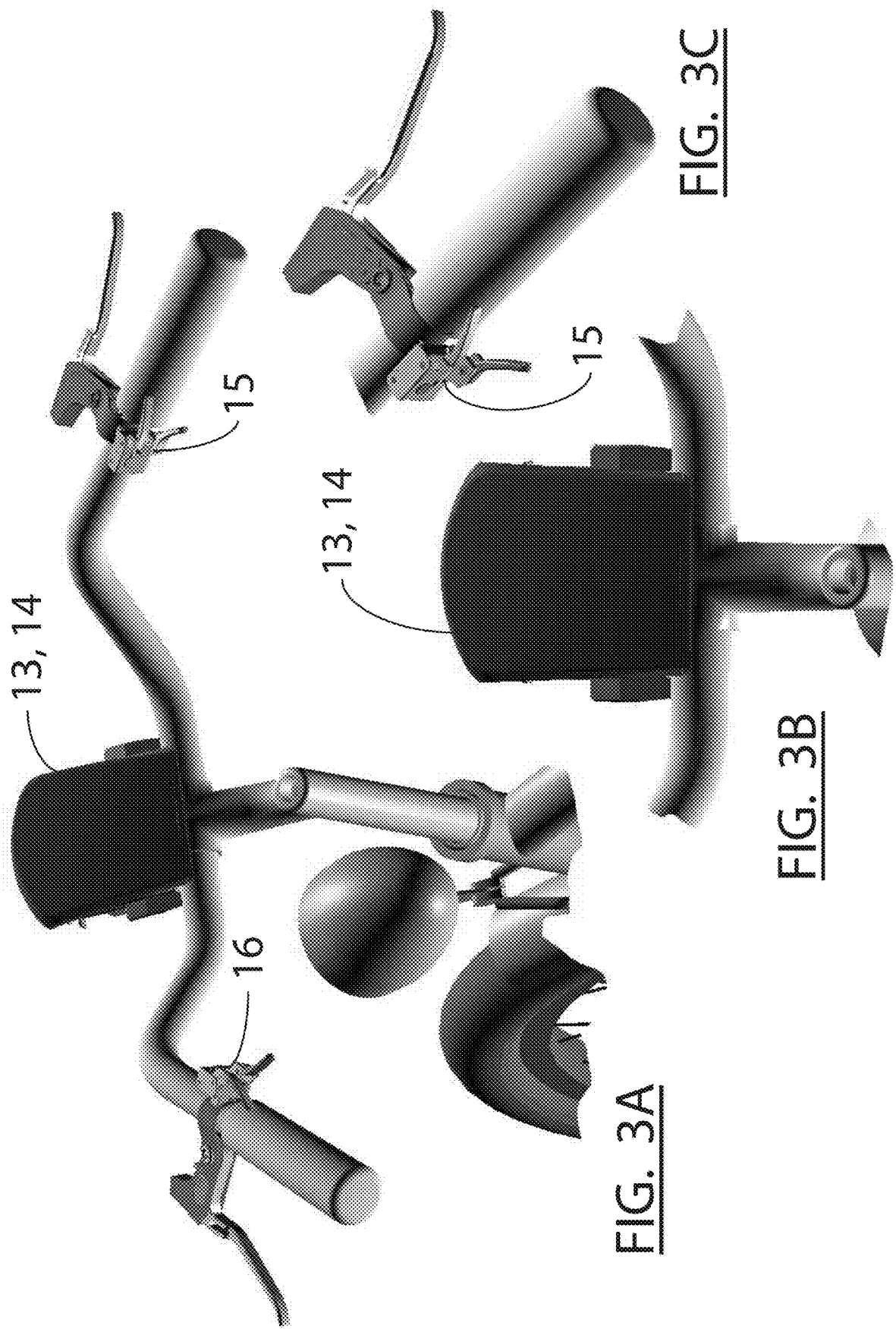
FIG. 3A is a perspective view of the operator panel, switches and control system of the preferred and alternate embodiments of the automatic bicycle shifter and chain driver of the present invention in preferred location on the bicycle handlebars.
FIG. 3B is a closeup view of the operator panel and control system of the preferred and alternate embodiments of the automatic bicycle shifter and chain driver of the present invention.
FIG. 3C is a view of the manual override switches for the rear derailleur of the preferred and alternate embodiments of the automatic bicycle shifter and chain driver of the present invention depicted in their preferred mounting position on the right bicycle handlebar.
Figure 4:
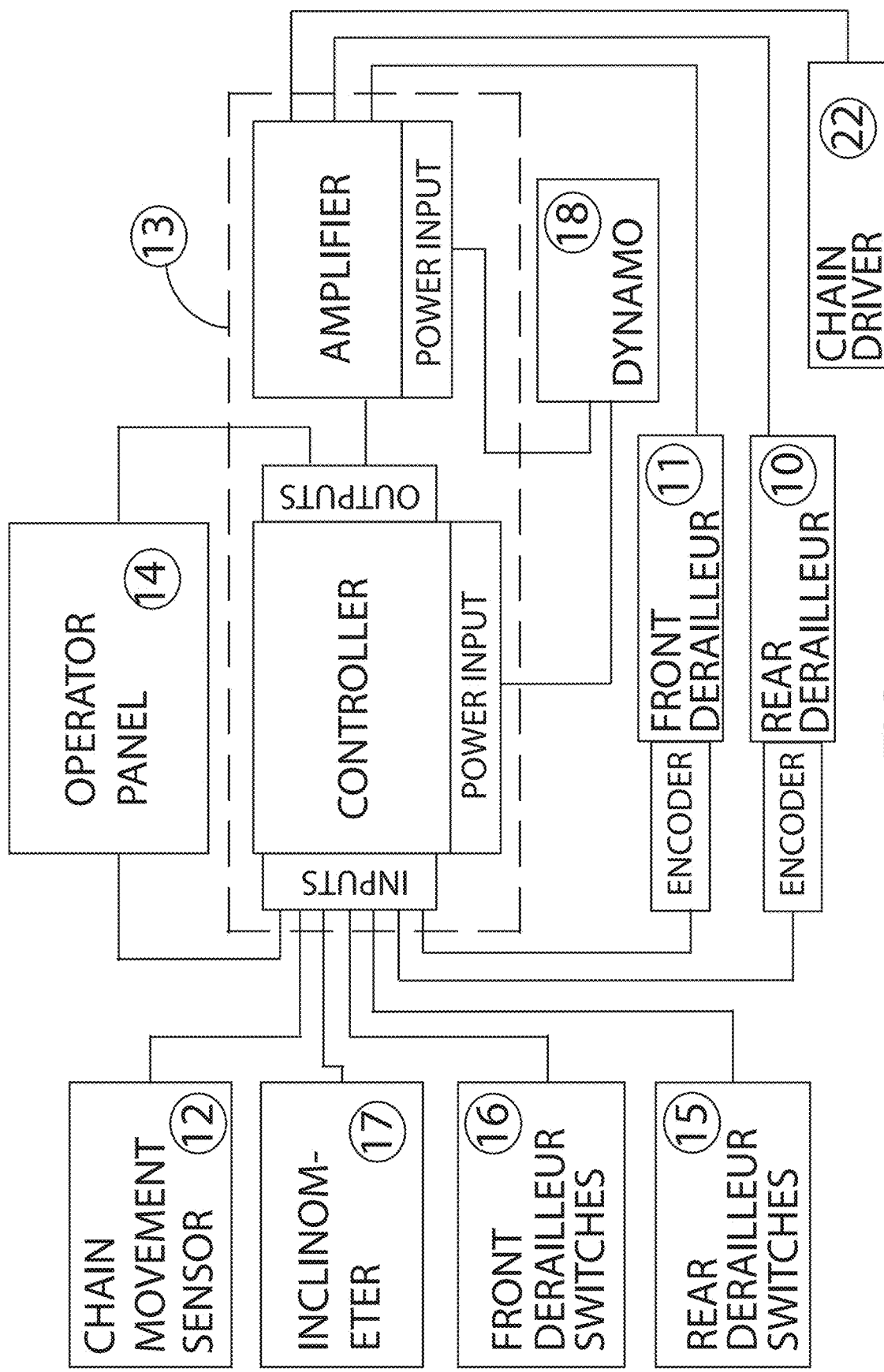
FIG. 4 is a block diagram of the control system and components of the preferred and alternate embodiments of the automatic bicycle shifter and chain driver of the present invention.

Preferred Automatic Bicycle Shifter Embodiment Construction—FIGS. 1-4.

With reference to FIGS. 1-4, the preferred embodiment 100 of the automatic bicycle shifter and chain driver of the present invention comprises rear electrically powered derailleur assembly 10 serving to alternate chain 19 between sprockets 20 of rear wheel hub assembly 21, chain driver actuator 22 of chain driver apparatus 111 serving to energize chain 19 in the forward direction upon shifting need combined with lack of chain motion thereof, electrically powered front derailleur assembly 11 serving to alternate chain 19 between front sprockets assembly 23 of pedals ratchet apparatus 112 serving to sever power transmission to pedals assembly 24 upon actuation of chain driver 22, chain movement sensor 12 rotationally affixed to chain driver 22, control system 13, operator panel 14, rear derailleur manual shifting switches 15, front derailleur manual shifting switches 16, bicycle inclinometer 17 and dynamo 18 serving as expended power replenishment means as well as bicycle speed sensing means, all connected by wiring harness 25 (partially shown) enabling various control components to communicate thereof and thereto.

Figure 5:
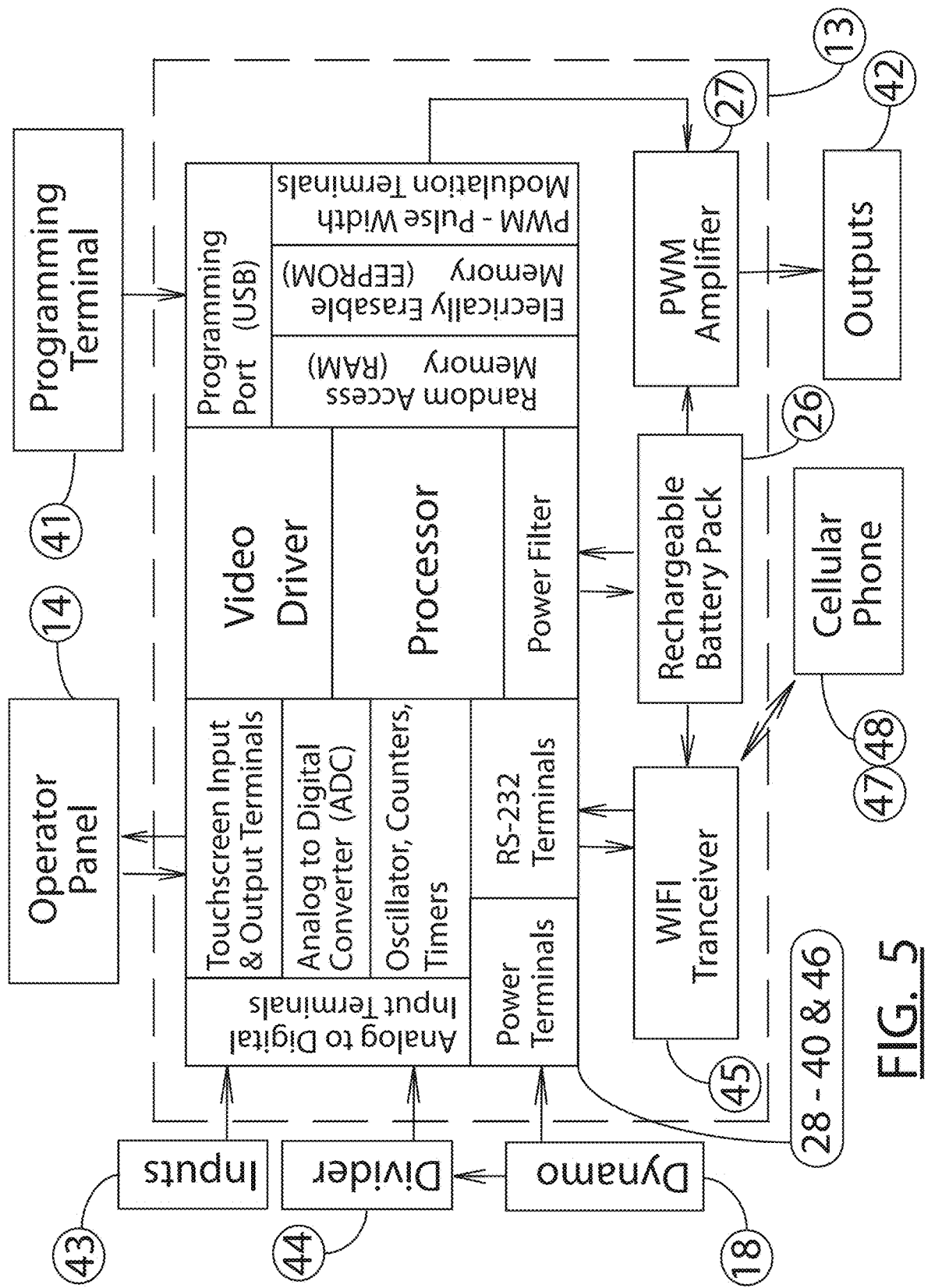
FIG. 5 is a block diagram of the controller of the preferred and alternate embodiments of the automatic bicycle shifter and chain driver of the present invention.

Preferred and Alternate Embodiment Controls—FIG. 5.

With reference to FIG. 5, the preferred and alternate embodiments of the automatic bicycle shifter and chain driver of the present invention includes Control system 13 comprising steady power supply rechargeable battery pack 26, pulse width modulation (PWM) amplifier 27 and a controls section comprising processor 28, video driver 29, random access memory (RAM) 30, oscillator/counters/timers subsection 31, analog to digital converter (ADC) subsection 32, and power filter 33, acting as an integral system serving to execute programming instructions received through universal serial (USB} programming port 34 and stored into electrically erasable programmable read only memory (EEPROM) 35 in order to control pulse width modulation (PWM) output terminals 36 in response to analog signals received through analog to digital (ADC) input terminals 37 and real time operator instructions from touchscreen display input terminals 38, display real time status through touchscreen display output terminals 39 with consumed power constantly being replenished through power terminals 40. Software updates to controls system 13 and touchscreen display 14 executed through programming terminal 41 are not limited to archiving existing user settings, downloading other users settings, installation of alternate user interfaces and patches geared to continually improve system performance of pulse width modulation (PWM) outputs 42 in response to inputs 43 of rear derailleur 10, front derailleur 11, chain movement sensor 12, rear derailleur manual shifting switches 15, front derailleur manual shifting switches 16, inclinometer 17, bicycle speed input signal received through dynamo voltage divider 44 and improved conservation of power received from power source dynamo 18. WIFI Transceiver 45 with bidirectional communication to control system 13 through RS-232 terminals 46 facilitates alternate control of the preferred and alternate embodiments of the automatic bicycle shifter and chain driver of the present invention through cellular phone 47 running a custom user interface and application communication software 48.

Figure 6:
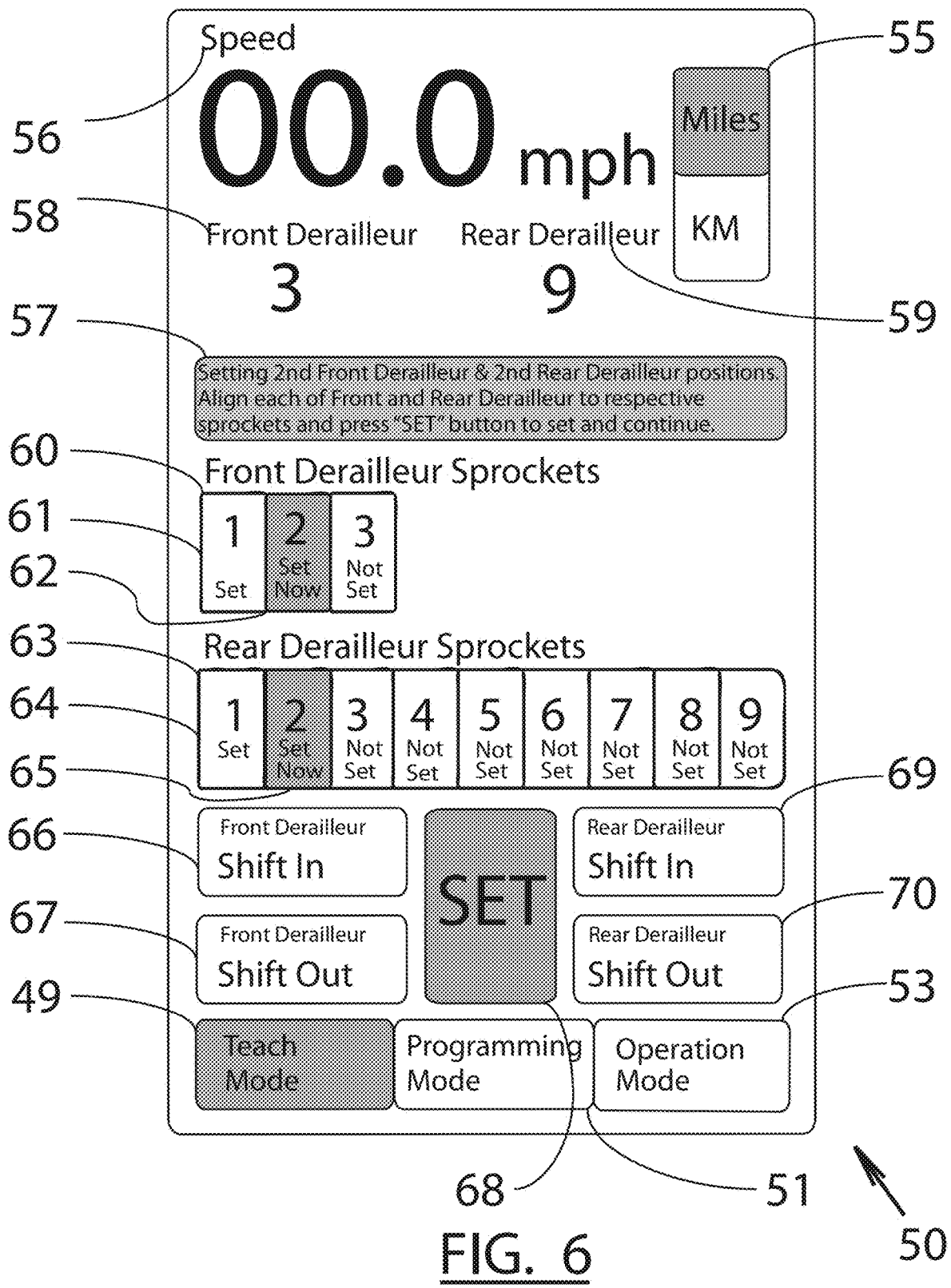
FIG. 6 is a view of the preferred operator panel "Teach Mode" user interface of the preferred and alternate embodiments of the automatic bicycle shifter and user interface of the present invention.
Figure 7:
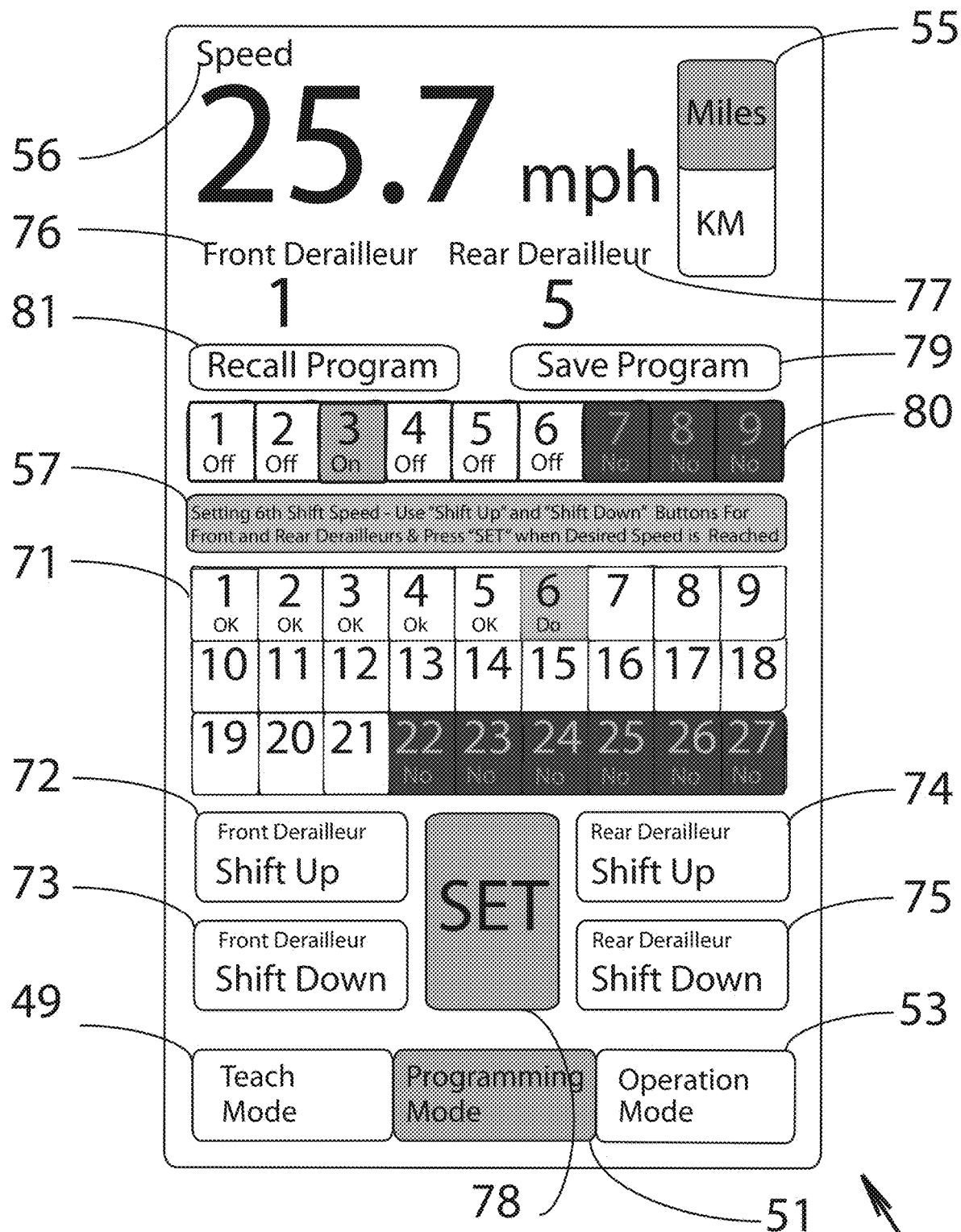
FIG. 7 is a view of the preferred operator panel "Programming Mode" user interface of the preferred and alternate embodiments of the automatic bicycle shifter and user interface of the present invention.
Figure 8:
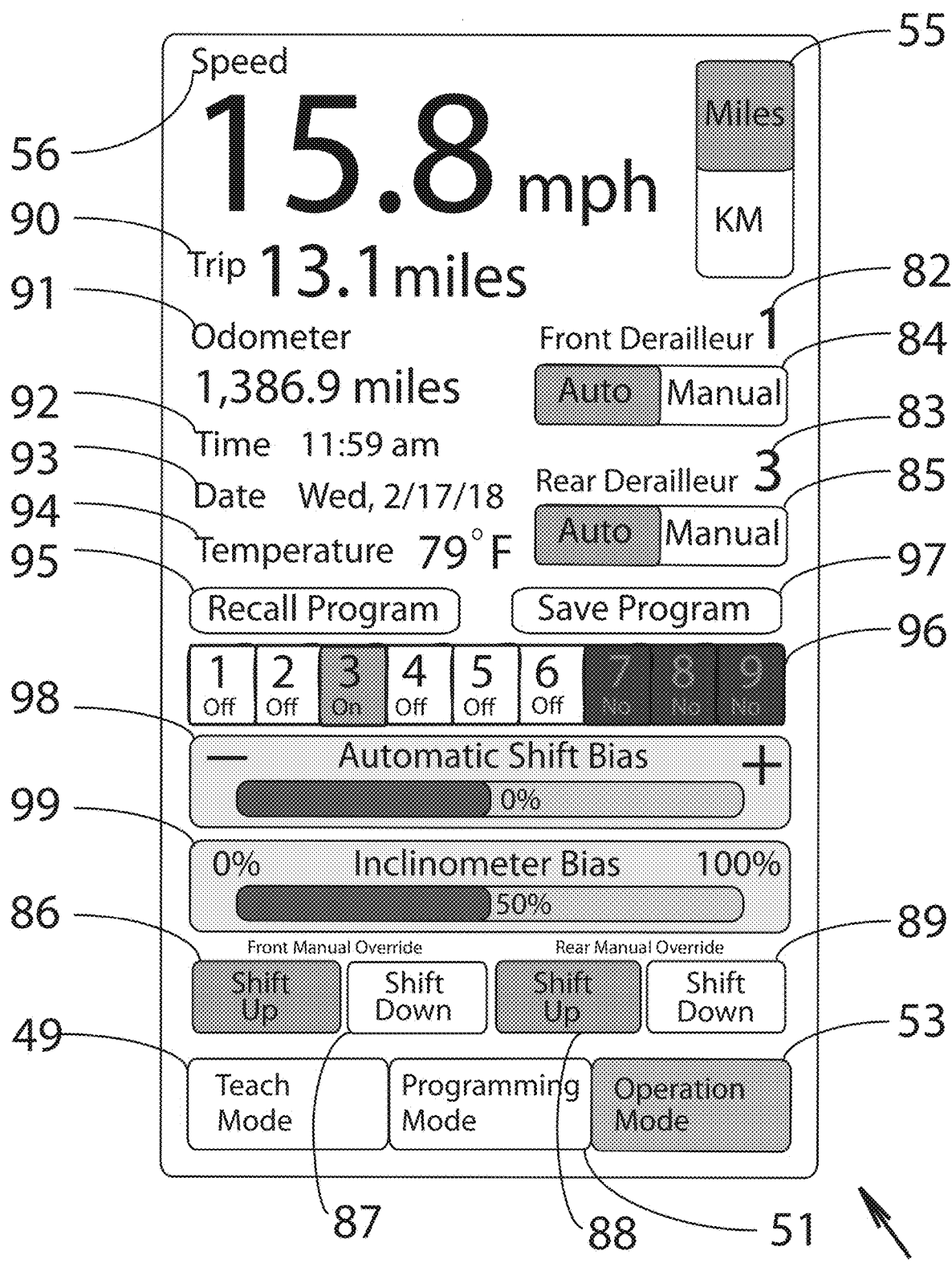
FIG. 8 is a view of the preferred operator panel "Operation Mode" user interface of the preferred and alternate embodiments of the automatic bicycle shifter and user interface of the present invention.

Preferred and Alternate Embodiment User Interface—FIGS. 6-8.

With reference to FIGS. 6, 7 and 8, touchscreen operator panel display 14 of the preferred and alternate embodiments of the automatic bicycle shifter and chain driver of the present invention includes "Teach Mode" selection button 49 used to enter into "Teach Mode" operator screen 50, "Programming Mode" selection button 51 used to enter into "Programming Mode" operator screen 52 and "Operation Mode" selection button 53 used to enter into "Operation Mode" operator screen 54.

With reference to FIG. 6, touchscreen display 14 of the preferred and alternate embodiments of the automatic bicycle shifter and chain driver of the present invention in "Teach Mode" operator screen 50 entered into by depressing button 49 after removal of bicycle drive chain for maximum visibility allows the user to define number of front derailleur shift positions, rear derailleur shift positions, align defined front derailleur shift positions to respective front sprockets and align defined rear derailleur shift positions to respective rear sprockets. "Teach Mode" screen operator screen includes speed selection button 55 enabling user to select speed and distance units in Miles or kilometers (KM), bicycle speed display 56, user prompt window 57 used in "Teach Mode" screen 50 to walk user through setup initially prompting user for number of front derailleur sprockets entered through window 58 initially displaying a value of "1" and incrementing with each user tap to window 58 until the correct number of front derailleur sprockets is displayed followed by user tapping window 57 for entry thereof, number of rear derailleur sprockets entered through window 59 also initially displaying a value of "1" and incrementing with each user tap to window 59 until the correct number of rear derailleur sprockets is displayed followed by user tapping window 57 for entry, with window 57 subsequently walking user through setting of front derailleur sprockets alignment positions as depicted in window 60 reflecting number of front derailleur sprocket positions defined through window 58, with defined front sprockets alignment positions 61 depicting text "Set" and with front sprocket alignment position being defined 62 in gray highlight background and depicting text "Set Now" and front derailleur sprocket alignment positions yet to be set depicting text "Not Set", and rear derailleur sprockets alignment positions depicted in window 63 also reflecting number of rear derailleur sprocket positions defined through window 59, with defined rear derailleur sprockets alignment positions 64 depicting text "Set" and rear derailleur sprocket alignment position being defined 65 in gray highlight background and depicting text "Set Now" and rear derailleur sprocket alignment positions yet to be defined depicting text "Not Set", front derailleur "Shift In" button 66 and front derailleur "Shift Out" button 67 used to inch front derailleur into accurate alignment with respective sprocket for front derailleur position being defined in window 62 prior to user depressing "SET" button 68 to set, rear derailleur "Shift In" button 69 and rear derailleur "Shift Out" button 70 used to inch rear derailleur into alignment with respective sprocket for rear derailleur position being defined in window 65 prior to depressing "SET" button 68 to set. Once a front or rear sprocket position is set, user prompt window 57, front derailleur sprocket position window 62, rear derailleur sprocket position window 65, front derailleur status window 60 and rear derailleur status window 63 all update to guide user through setting of following front and rear derailleur sequential sprocket position with process continuing until all sprocket positions depicted in front derailleur sprockets position window 60 and all rear derailleur sprockets position depicted in window 63 are defined. Once all front and rear derailleur sprocket positions are defined, prompt window 57 instructs user to replace the bicycle drive chain and depress button 51 to enter into programming mode.

With reference to FIG. 7, touchscreen display 14 of the preferred and alternate embodiments of the automatic bicycle shifter and chain driver of the present invention in "Programming Mode" operator screen 52 entered into by depressing button 51 comprises bicycle miles or kilometers (KM) units selection button 55, bicycle speed display window 56, aforementioned user prompt window 57 serving in "Programming Mode" to walk the user through derailleur programming initially prompting the user to define the number of desired "Shift Speeds" entered by depressing desired number displayed in window 71 encompassing all possible shifter combinations based on user input of number of front derailleur and rear derailleur sprocket positions previously defined in "Teach Mode" and initially all displayed in an disabled black background and carrying text "No" with user input subsequently causing all desired "shift speeds" backgrounds to turn to white denoting availability for programming. User prompt window 57 subsequently prompts the user to set all "shift speeds" sequentially starting with "shift speed" "1" in turn denoted in window 71 by text "Do" and is highlighted with a gray background which the user then programs by defining a certain shift combination while riding and depressing manual front derailleur "Shift Up" button 72, front derailleur "Shift Down" button 73, rear derailleur "Shift Up" button 74 and rear derailleur "Shift Down" button 75 with window 76 prompting user with front derailleur sprocket position being set and window 77 prompting user with rear derailleur sprocket position being set. Once selection of "shift speed" and respective front and rear derailleur selections are made, user accelerates or decelerates until desired shift speed thresholds as displayed in speed display 56 is reached and then depresses programming speed "SET" button 78 to set which then results in denoted text for respective programming "shift speed" in window 71 to switch from "Do" to "Ok" with window 71 subsequently indexing to following sequential position which is then denoted by text "Do" for programming, with the process repeating sequentially until all defined "shift speeds" in window 71 are set. User depresses "Save Program" button 79 to save programmed shift positions in window 71 at any time by subsequently depressing any of available programming button positions in window 80 initially all depicted in a disabled black background and denoted by text "No" and which upon saving turn to white are depicted with text "On" and with already programmed program buttons denoted by text "Off". Program saving feature thereby enables user to save different riding profiles, such as for casual riding, speed riding, racing, etc. . . . or with additional simplified profiles making use of only the front or the rear derailleur. "Recall Program" button 81 followed by program selection from window 80 is used to recall any saved programs for modification or reprogramming by subsequently depressing any of "shift speeds" in window 71 for redefinition using the same procedure employed in initial programming. For maximum flexibility, no restriction is placed on the number of shift combinations, repetition of shift positions or the number of programmed shift positions from displayed selection in window 71 prior to the user being able to enter into operation screen 54.

With reference to FIG. 8, touchscreen display 14 of the preferred and alternate embodiments of the automatic bicycle shifter and chain driver of the present invention in "Operation Mode" operator screen 54 entered into by depressing button 53 comprises bicycle miles or kilometers (KM) units selection button 55, bicycle speed display 56, front derailleur position display 82, rear derailleur position display 83, command button to place front derailleur in automatic or manual mode 84, command button to place rear derailleur in automatic or manual mode 85, front derailleur manual and override shift up button 86, front derailleur manual and override shift down button 87, rear derailleur manual and override shift up button 88, rear derailleur manual and override shift down button 89, accumulated trip mileage 90, odometer 91, time 92, date 93, temperature display 94 which defaults to degrees "Fahrenheit" units if miles units are selected through button 55 or degrees "Celsius" units if KM units are selected, recall program button 95 used to reactivate programs saved through window 80 in "Programming Mode" screen 52 and depicted in window 96 with a white background and are denoted with an "Off" designation and which upon activation take on a gray background and are then denoted with an "On" designation while selection buttons not programmed in "Programming Mode" screen 52 are displayed in a disabled black background and displayed with a "No" designation, save program button 97 used to save any modification to recalled program selection assigned a gray background and denoted by an "on" designation in window 96, "Automatic Shift Bias" touch control slide bar 98 serving to permit user to scale up or down programmed speed shifting thresholds of programmed speed positions in aforementioned programming position window 71 of "Programming Mode" screen 52 for active program selection in window 96 denoted with "On" designation based on own preference in real time, and "Inclinometer Bias" road inclination touch control slide bar 99 serving to proportionately scale up of down automatically configured attenuation to programmed shifting speed thresholds in aforementioned programming position window 71 of "Programming Mode" screen 52 for active program selection in window 96 denoted with "On" designation, in order to achieve acceptable pedaling effort levels based on road inclination and conditions in real time.

User Interface Options—FIGS. 6-8

With Reference to FIGS. 6-8, the preferred embodiment of the user interface of preferred and alternate embodiments of the automatic bicycle shifter and chain driver of the present invention is fitted for operation with a front and a rear derailleur, as modern bicycles are typically equipped. In the event that only either a front or the rear derailleur is connected to the system, user interfaces for "Teach Mode" 50, "Programming Mode" 52 and "Operation Mode" 54 automatically update to reflect controls for only defined derailleur with non pertinent control buttons defaulting in depiction to disabled black background and are additionally denoted by text "No". Under this simplified setup the number of "shift speeds" for the bicycle becomes simply equal to number of sprockets for the defined derailleur.

Figure 12A:
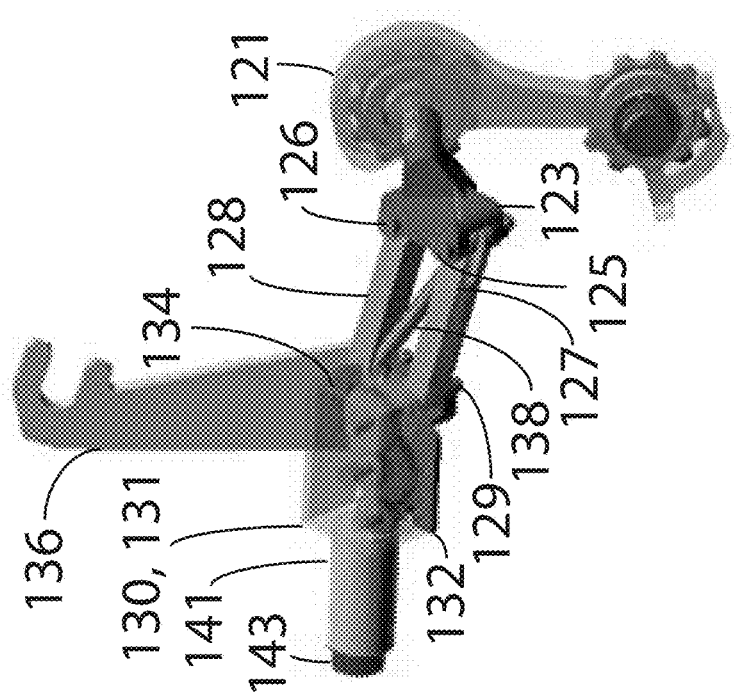
FIG. 12A is an oblique perspective view of the rear derailleur of the preferred and alternate embodiments of the automatic bicycle shifter and chain driver of the present invention in extreme extended position.
Figure 12B:
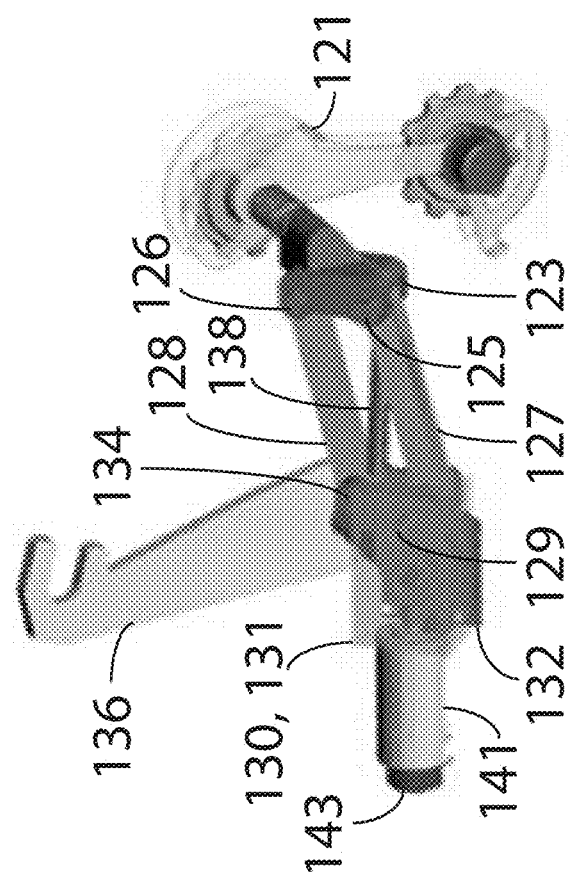
FIG. 12B is an oblique perspective view of the rear derailleur of the preferred and alternate embodiments of the automatic bicycle shifter and chain driver of the present invention in extreme retracted position.

Preferred and Alternate Embodiments Rear Derailleur—FIGS. 9A-9C, 10A, 10B, 11A, 11B, 12A & 12B With Reference to FIGS. 9A-9C, 10A, 10B, 11A, 11B, 12A & 12B, rear bicycle derailleur assembly 10 of the preferred and alternate embodiments of automatic bicycle shifter and chain driver of the present invention comprises chain guiding assembly 121 affixed to axle 122 pivotally operable about bicycle linkage output yoke 123 and energized in the clockwise direction (FIG. 9A—CW) by torsion spring 124 with ends retained thereto and to derailleur linkage output yoke 123 energized in the lateral direction by thereto pivotally operable axles 125 and 126 affixed to links 127 and 128 respectfully with opposite end of link 127 affixed to shaft 129 of gearmotor 130 with housing 131 affixed to derailleur linkage input yoke 132 using screws 133 and opposite end of link 128 affixed to axle 134 pivotally operable in derailleur linkage input yoke 132 pivotally operable about axle 135 affixed to bicycle rear framework mounting bracket 136 and energized in the clockwise direction (FIG. 9A—CW) by means of thereto attached torsion spring 137 with opposite end thereof affixed to mounting bracket 136. Extension spring 138 with hook ends longitudinally retained and thereby serving to draw axles 125 and 134 closer together serves to bias position of chain guiding assembly 121 to end position extremities thereby serving as take up means for accumulative backlash in gearing of servo gearmotor 130. Chain guiding assembly 121 serves to laterally position drive chain 19 through constant engagement with captive idler sprockets 139 and 140. Exploded views FIGS. 10A-10B serve to further illustrate construction of various components of rear derailleur 10 with FIGS. 11A-11B depicting perspective top views of rear derailleur 10 actuation in extreme extension and retraction positions, and FIGS. 12A-12B depicting oblique perspective views of rear derailleur 10 in same extreme extension and retraction positions.

Preferred Embodiment Actuator—FIGS. 13A & 13B

With Reference to FIGS. 13A & 13B, servo gearmotor 130 of the preferred and alternate embodiments of the automatic bicycle shifter and chain driver of the present invention includes motor 141 with body permanently affixed to gearmotor housing 131 and with armature shaft 142 rotatably affixed at the rear to encoder 143 and with opposite end thereof penetrating a slip fit connection in gearmotor housing 131 and through a rotatably secure connection to worm gear 144, serves to drive output shaft 129 through high ratio reduction gearset arrangement 145 with encoder signals subsequently processed and stored by electronic control system 13 to resolve position of derailleurs 10 and 11 thereof acting as a signals processing and storage means.

Preferred Embodiment Front Derailleur—FIGS. 14A-14C

With Reference to FIGS. 14A-14C, front bicycle derailleur assembly 11 of the preferred and alternate embodiments of the automatic bicycle shifter and chain driver of the present invention comprises chain guiding assembly 221 affixed to bicycle linkage output yoke 223 and serving to align chain 19 with selected sprocket of front sprocket assembly 23 (not shown in Figs.) through action of output yoke 223 energized in the lateral direction by thereto pivotally operable axles 225 and 226 affixed to links 227 and 228 respectfully with opposite end of link 227 affixed to shaft 129 of gearmotor 130 with housing 131 affixed to derailleur linkage input yoke 232 using screws 233 with opposite end of link 228 affixed to axle 234 pivotally operable in derailleur linkage input yoke 232 affixed to mounting bracket 236 serving to affix front derailleur assembly 11 to bicycle framework. Extension spring 238 with hook ends longitudinally retained and thereby serving to draw axles 225 and 234 closer together serves to bias position of chain guiding assembly 221 to one of position extremities thereby serving as take up means for accumulative backlash in gearing of servo gearmotor 130.

Preferred Embodiment Chain Driver—FIGS. 15-18, 21, 22 & 25—29.

With Reference to FIGS. 15-18, 21, 22 & 25-29, the preferred embodiment of the chain driver 111 of the preferred embodiment 100 of the automatic bicycle shifter and chain driver of the present invention serves to initiate chain motion in the forward direction as required for shifting action upon lack of actuation thereof due to the rider ceasing to alternate the pedals during instances of coasting or braking with resultant reduction in speed requiring down shifting action by the chain derailleurs or in instances of inadvertent increase in speed such as during downhill descent requiring up shifting action. This controls philosophy inherently requires decoupling of the rider pedals in order to permit necessary free chain motion less power transmission thereto. With additional reference to FIGS. 16 & 25-29, pedals ratchet mechanism 112 of the preferred and alternate embodiments of the automatic bicycle shifter and chain driver of the present invention serves to permit energization of chain 19 for power transmission to rear sprockets assembly 20 upon actuation of pedals assembly 24 in the forward direction and the necessary slip action upon chain driver 111 energizing the chain in the forward direction while the pedals are in a stationary or reverse state in order to prevent power transmission thereto.

With reference to FIGS. 15-18, 21 & 22 again, the preferred embodiment of the chain driver 111 of the preferred embodiment 100 of the automatic bicycle shifter and chain driver of the present invention makes use of actuation of pawl assembly 320 by thereto rotatably captive sprockets assembly 20, upon forward motion of chain 19 due to forward actuation of pedals assembly 24, resulting in engagement of rear hub ratchet 321 and thereto attached bicycle rear hub 21 resulting in bicycle forward motion, and additionally makes use pawl cam assembly 322 actuated by chain driver motor 323, pinion 324 and gear 325 of chain driver 22 forcing collapse of pawl hub assembly 320 and thereby severance of connection to rear hub ratchet 321 and thereto attached bicycle rear hub 21 with subsequent rotation of pawl cam assembly 322 forcing rotation of pawl assembly 320 and thereto captive rear sprockets assembly 20 resulting in forward motion of chain 19 lest power transmission to bicycle pedals due to pedals ratchet mechanism 112 facilitating slip at front sprockets assembly 23 thereby permitting derailleurs 10 and 11 of the preferred embodiment shifter apparatus of the present invention to alternate sprockets while the bicycle pedals are in a stationary state.

With reference to FIGS. 17-24, the preferred embodiment of the chain driver 111 of the preferred embodiment 100 of the automatic bicycle shifter and chain driver of the present invention comprises pawl assembly 320 including pawl cylinder 326 rotationally secured at one end to rear sprockets assembly 20 through inside diameter splines 327 and accurately fitting outside diameter splines 328 thereof with opposite end pilot diameter extension 329 accurately fitting inside diameter 330 of pawl hub 331 secured thereto by a plurality of screws 332 extending through clearance holes in pawl hub 331 and fastened into a matching plurality of tapped holes in pawl cylinder 326 thereby forming one assembly with a plurality of axial inner gib extensions 333 and outer gib extensions 334 serving to radially retain a matching plurality of pawls 335 urged in the outer radial direction by a matching plurality of compression springs 336 retained in radially oriented cavities 337 in axial inner gib extensions 333 of pawl hub 331 with cylindrical surfaces 338 of pawl hub inner gib extensions 333 limiting outward radial travel of pawls 335 through contact with mating surfaces 339 thereof. Pawl cam assembly 322 includes cam hub 340 comprising axial extension 341 with outside diameter 342 accurately slip fit to inside diameter 343 of pawl cylinder 326, and a plurality of radially extended cams 344 serving to retract pawls 335 in inward radial direction through contact with mating cylindrical relief features 345 upon relative rotation thereof under the action of chain driver motor 323 acting through pinion 324 transmitting motion through gear 325 rotationally retained to cam hub 340 by means of internal diameter splines 346 and mating outside diameter splines 347 of pawl hub 340. With reference to FIGS. 17, 18, 21 & 22 again, bearings 348 accurately fit into counterbores in opposite ends of cam hub 340 provide necessary radial support and rotation antifriction means for pawl cam assembly 322, thereto radially supported accurately fit to outside diameter pawl hub assembly 320 along with thereto retained rear sprockets assembly 20, about rear axle shaft 349 extending between bicycle frame rear right clevis 350 and left clevis 351 and secured at both ends by locknuts 352.

With reference to FIG. 15, ratchet 321 is attached to rear hub 21 my means of a plurality of screws 353 protruding through clearance holes in flange of rear hub 21 and are anchored into a matching plurality of tapped holes in ratchet 321. Rear wheel hub assembly 21, attached to rear wheel by a plurality of spokes (not shown in FIG. 15), is rotationally operable about shaft 349 and is rotationally secured thereto by a duplex set of bearings 348 adjacent to nesting pawl hub assembly 320 and thereto nested pawl cam assembly 322 also rotationally operable about shaft 349 through other aforementioned duplex set of bearings 348, all thereby forming one integral bicycle rear drive assembly supported by shaft 349 between right bicycle clevis 350 and left bicycle clevis 351 and secured thereto by means of locknuts 352.

With reference to FIGS. 23 & 24, withdrawal of pawls 335 under the action of cams 344 is facilitated through pure rotation action about respective centers 354 of pawls 335 concentric cylindrical profiles 355 and 356 retained between matching cylindrical profiles 357 of pawl hub inner gib extension 333 and matching cylindrical profile 358 of pawl hub outer gib extension 334 respectively.

Figure 17:
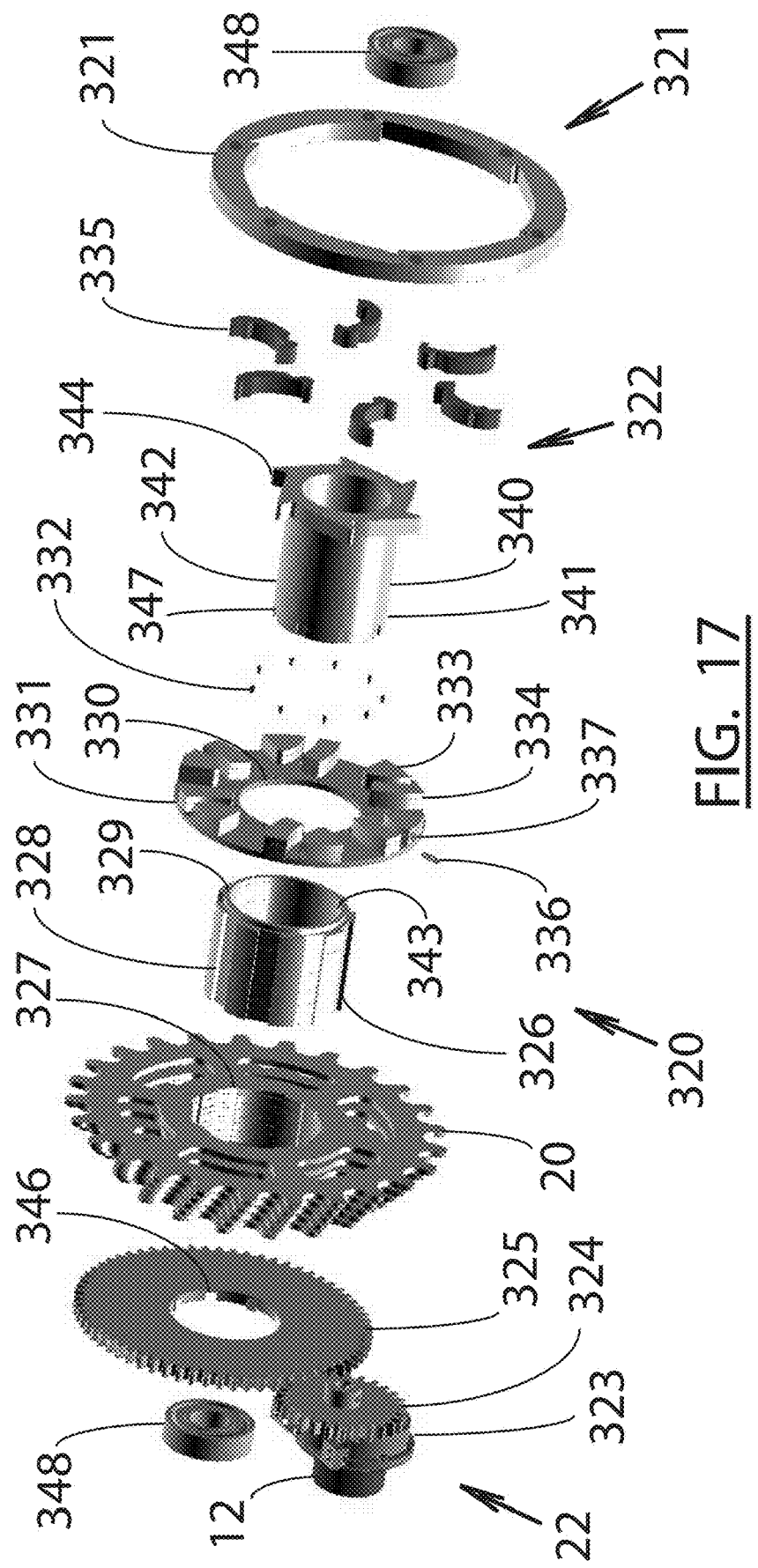
FIG. 17 is an exploded view of the preferred embodiment of the chain driver of the automatic bicycle shifter and chain driver of the present invention.

With reference to FIGS. 17 and 18, gib extensions 334 aside from accurately positioning cam hub 340 through contact with cams 344 for effective engagement with pawls 335 upon actuation of chain driver motor, additionally serve to force unconditional rotation of cam hub 340, thereto rotationally affixed gear 325, pinion 324 and consequently force rotation of chain driver motor 323 and thereto rotationally affixed chain movement sensor 12 which thereby acts as a chain forward movement sensing means, upon actuation of thereto retained rear wheel hub sprockets 20 due to any forward actuation of bicycle drive chain 19.

With reference to FIG. 19 depicting engagement of pawl 335 to ratchet 321 upon actuation of rear sprockets assembly 20, a fundamental requirement of this arrangement is the angle formed between line of action 359 and tangent 360 at point of engagement of pawl 335 and ratchet 321 being on the order of 60 to 80 degrees in order to ensure that reaction force "C" serves to draw pawl 335 in the outward radial direction with axial inner gib extension 333 of pawl hub 331 providing reaction "D" necessary for stable equilibrium, permitting actuation thereof.

With reference to FIG. 20 depicting slip action between pawl 335 and ratchet 321 under conditions where the rear wheel is in motion with the rear sprockets assembly 20 in a predominantly stationary state, angle between line of action 361 between ratchet 321 and pawl 335 and tangent 362 at point of engagement ideally falls within the 5 to 10 degree range in order to result in acceptable force component "B" along direction of inward radial translation of pawl 335 due to resultant reaction force "A", thereby facilitating reliable slip action thereof.

And thereby the outlined chain driver means for disengagement of the rear wheel hub sprockets 20 from the bicycle rear wheel hub assembly 21 and subsequent forward actuation thereof to produce the necessary consequent forward movement of the bicycle drive chain 19 permitting an "on demand" arbitrary operation of the bicycle derailleurs 10 and 11 notwithstanding operation of the bicycle pedals.

Preferred and Alternate Embodiments Pedals Ratchet Mechanism—FIGS. 25-29.

With reference to FIGS. 25-29, the preferred embodiment of the pedals ratchet mechanism 112 of the preferred and alternate embodiments of the automatic bicycle shifter and chain driver of the present invention comprises front sprockets assembly 23, including a plurality of sprockets 370 of different ratios rotationally retained to ratchet hub 371 through sprocket internal splines 372 and matching ratchet hub external splines 373 and separated by spacers 374, radially retained to pedals driveshaft 375 by a duplex set of bearings 376 disposed in counterbores in opposite ends of ratchet hub 371. Pedals driveshaft 375 is radially retained to bicycle frame yoke 377 through angular contact bearings 378 and is rotationally keyed to right pedal 379 and left pedal 380 by means of keys 381 and is additionally rotationally retained by key 382 to pawl hub 383 radially retaining a plurality of pawls 384 rotatably operable about respective centers and spring loaded in the outward radial direction by a matching plurality of springs 385.

With reference to FIG. 28, pawl hub 383 is centrally located and internal to ratchet hub 371 with plurality of pawls 384 urged in the outward radial direction by said springs 385 to ensure engagement with matching plurality of pockets 386 (depicted in highlight) of ratchet hub 371 thereby forcing engagement thereof upon rotation of pawl hub 383 in the counterclockwise (FIG. 28—CCW) direction and thereby ability to drive ratchet hub 371 in the counterclockwise direction upon actuation of pawl hub 383 by thereto keyed pedals 379 and 380 in the forward direction. Profile of pockets 386 additionally provides for the necessary slip action upon rotation of ratchet hub 371 in the counterclockwise direction with respect to pawl hub 383 thereby the ability of ratchet hub 371 to slip past pawl hub 383 and thereto rotationally retained pedals 379 and 380, under forward rotation of sprockets assembly 23 due to forward motion of chain 19 upon actuation of preferred embodiment chain driver 111 of the preferred embodiment 100 of the automatic bicycle shifter of the present invention.

As depicted in FIGS. 25, 27 & 29, pedals driveshaft 375 is secured in the axial direction by locknuts 387 serving to axially retain pedal 380 to spacer 388 to angular contact bearing 378 to bicycle frame yoke 377 on the left hand side and right pedal 379 against spacers 389 serving to axially retain pawl hub 383 and ratchet hub 371 as one integral ratcheting assembly retaining angular contact bearing 378 to bicycle frame yoke 377 on the right hand side. Actuation of the bicycle pedals 379 and 380 in the forward direction result in rotation of thereto keyed pedals driveshaft 375 in turn forcing rotation of thereto keyed pawl hub 383 forcing radially outward spring loaded pawls 384 to engage ratchet hub 371 forcing rotation thereof and that of thereto retained sprockets 370 resulting in forward motion of chain 19 and power transmission to rear sprockets assembly 20. Conversely, forward movement of chain 19 while pedals are in a stationary state results in rotation of sprockets 370 and thereto rotationally retained ratchet hub 371 causing slip over stationary pawl hub 383 keyed to stationary pedals driveshaft 375 and thereto keyed pedals and thereby facilitating free forward motion of chain 19 less power transmission thereof.

With reference to FIG. 27, pedals assembly 24 is depicted as an integral assembly comprising front sprockets assembly 23 and internal pedals ratchet mechanism 112 with partial view in FIG. 29 depicting partial internal construction thereof and thereby a bicycle pedals ratchet means permitting actuation of chain driver 22 less power transmission to pedals assembly 24.

Figure 30:
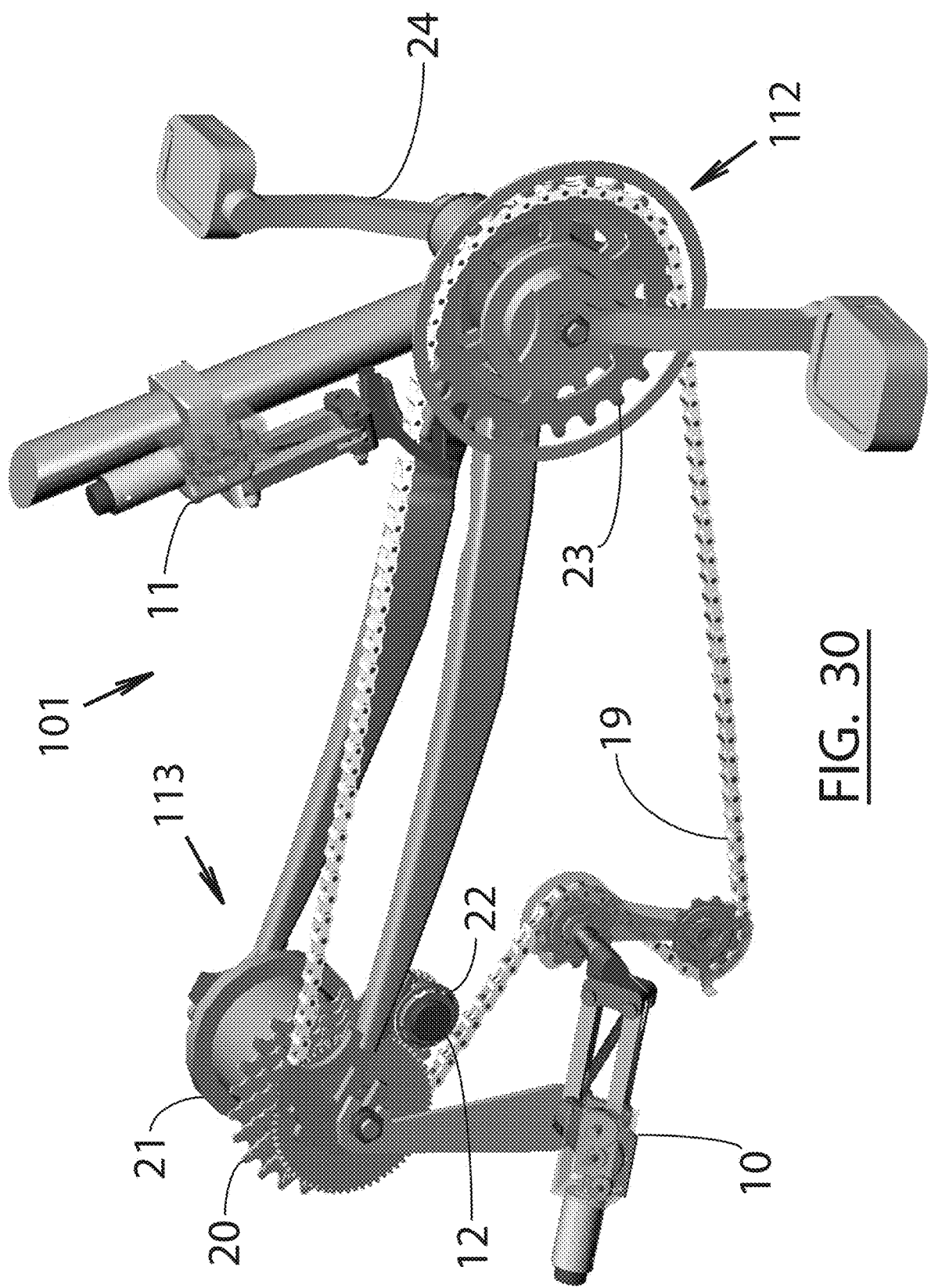
FIG. 30 is a perspective view of the powertrain of the first alternate embodiment of the automatic bicycle shifter and chain driver of the present invention.

First Automatic Bicycle Shifter Alternate Embodiment—FIGS. 16 & 30.

With reference to FIGS. 16 & 30, the powertrain construction of the first alternate embodiment 101 of the automatic bicycle shifter and chain driver of the present invention comprises the first alternate embodiment chain driver 113 along with pedals assembly 24 comprising aforementioned ratchet mechanism 112 and front sprockets assembly 23, rear derailleur 10, front derailleur 11, chain movement sensor 12, chain 19, rear sprockets assembly 20 and rear hub 21, along with all aforementioned controls components (not shown in FIG. 30) of the preferred embodiment 100 of the automatic bicycle shifter and chain driver of the present invention acting as one complete integral automatic bicycle shifter apparatus.

First Alternate Embodiment Chain Driver—FIGS. 16, 31-35.

With reference to FIGS. 16, 31-35, the first alternate embodiment of the chain driver 113 of the first alternate embodiment 101 of the automatic bicycle shifter and chain driver of the present invention includes pawl ratchet assembly 420 comprising pawl hub 421 with axially protruding portion 422 provided with splined features 423 serving to rotatably capture rear sprockets assembly 20 through accurately fitting mating splines 424 and a plurality of radially projecting portions 425 provided with an accurately profiled outer cylindrical periphery 426 and including a matching plurality of cylindrical features 427 serving to radially retain a matching plurality of pawls 428 while permitting individual pivoting motion about respective centers thereof with each individually biased in the outer radial direction by a matching plurality of torsion springs 429 retained in a matching plurality of cavities 430 in axially projecting portions 425 of pawl hub 421. A plurality of pins 431 Press fit into radially projecting portions 425 of pawl hub 421 protrude through a plurality of slots 432 of pawl collapsing cup 433 and acting through a matching plurality of springs 434 with opposite ends retained by a matching plurality of pins 435 press fit into pawl collapsing cup 433 thereof serve to bias pawl collapsing cup 433 in the clockwise (FIG. 31—CW) direction. Cam hub 436 with outside diameter 437 slip fit through inside diameter 438 of pawl collapsing cup 433 and including axially projecting portion 439 serve to secure pawl collapsing cup 433 against inside shoulder thereof by means of a plurality of screws 440 acting through holes 441 of cam hub 436 and tightly anchored into tapped holes 442 of pawl collapsing cup 433. Outside diameter 437 of cam hub 436 is slip fit through inside diameter 443 of pawl hub 421 and protrude through opposite end thereof to receive gear 444 rotationally affixed thereto through splines 445 of cam hub 436 and matching splines 446 thereof. Pawl collapsing cup 433 includes a plurality of axially extended cylindrically intermittent cams 447 individually poised clear of engagement of matching plurality of pawls 428 of pawl hub 421 with common inside cylindrical surface 448 slip fit to outer cylindrical periphery 426 of pawl hub 421. Cams 447 include individual recesses profiled at approximately 10 Degrees radially outwards at tangential engagement points of pawls 428 and provide the necessary cam action to collapse pawls 428 radially inwards upon relative circular motion in direction 32-1 depicted in FIG. 32 thereof. Radial support for pawl ratchet assembly 420 is provided by a set of bearings 449 slip fit into opposite counter bored cavities in cam hub 436.

With reference to FIGS. 33-35, rear wheel shaft 450 retained between bicycle frame right clevis 451 and left clevis 452 by locknuts 453 serves to support through said duplex set of bearings 449 pawl ratchet assembly 420 adjacent to but nested into ratchet hub 454 of rear wheel hub assembly 21 also supported by rear wheel shaft 450 by means of a duplex set of bearings 455 separated by spacer 456.

With reference to FIGS. 34 & 36, actuation of pedals assembly 24 in the forward direction results in forward motion of chain 19 resulting in actuation of rear sprockets assembly 20 in the counterclockwise direction (FIG. 36—CCW) in turn rotationally driving pawl ratchet assembly 420 resulting in engagement of pawls 428 with ratchet hub 454 of rear hub 21 and thereby resulting in forward rotation of rear hub 21 and consequently rear bicycle wheel connected thereto by a plurality of spokes 457.

With reference to FIGS. 34 & 37, upon change in speed requiring shifting action combined with lack of actuation of pedals 24 thereof, control system 13 energizes chain driver actuator 22 comprising motor 458, pinion 459 and gear 444, resulting in motion of cam hub 436 in the counterclockwise (FIG. 37—CCW) direction forcing rotation of thereto retained pawl collapsing cup 433 forcing relative motion between cams 447 and predominantly stationary pawl hub 421 forcing inward collapse of pawls 428 continuing until full rotational travel of slots 432 of pawl cup 433 across pins 431 of pawl hub 421 is reached with further motion thereof forcing rotation of pawl hub 421 in the counterclockwise (FIG. 37—CCW) direction. Free from engagement of ratchet hub 454 and consequently rear hub 21, rotation of pawl hub 421 results in rotation of thereto retained sprockets assembly 20 and forward motion of chain 19 with slip action by pedals ratchet mechanism 112 serving to sever power transmission to pedals assembly 24 thereby facilitating the necessary free motion of chain 19 in turn permitting shifting action by derailleurs 10 and 11 of the first alternate embodiment of the automatic bicycle shifter and chain driver of the present invention.

Figure 38:
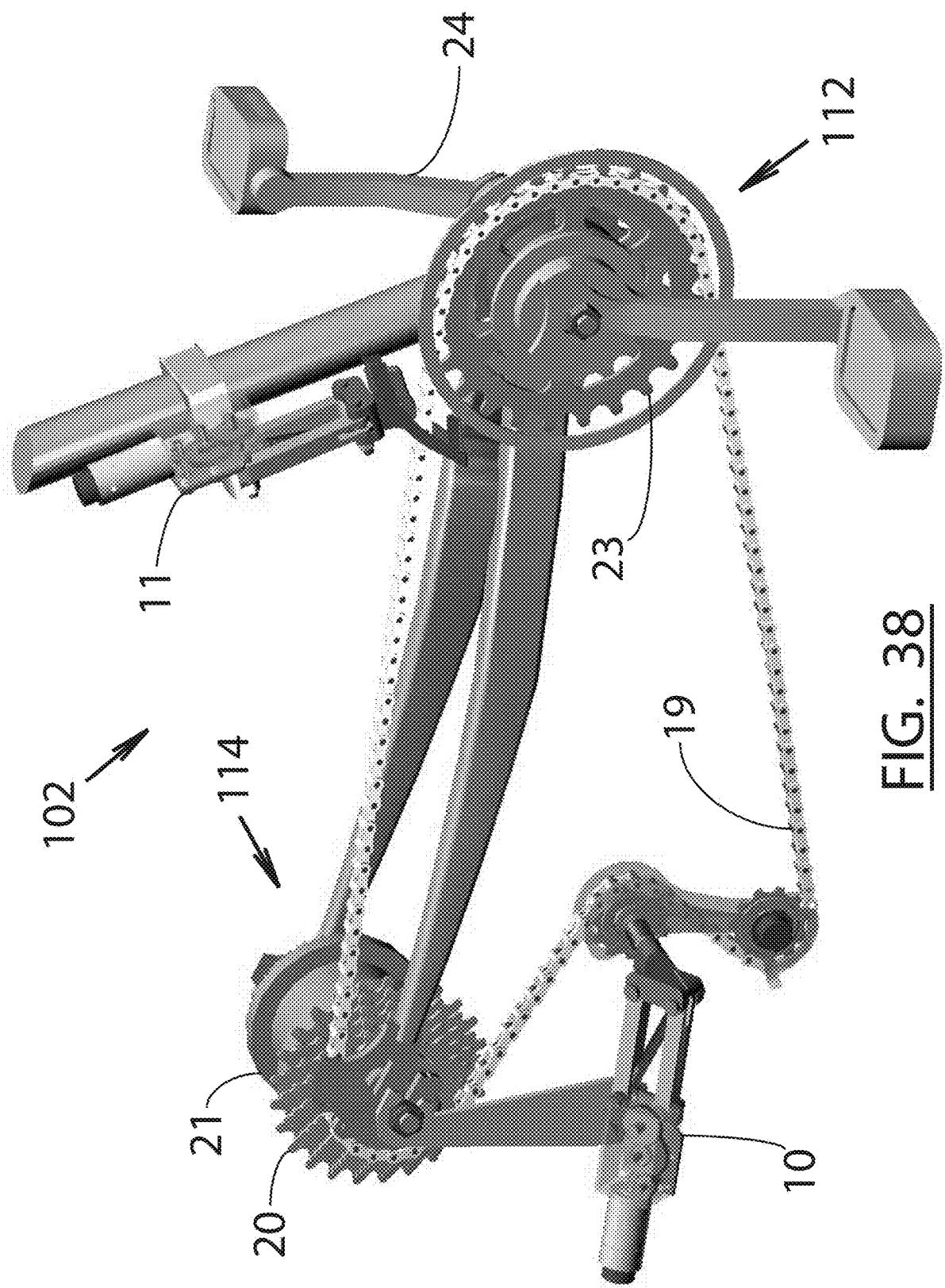
FIG. 38 is a perspective view of the powertrain of the second alternate embodiment of the automatic bicycle shifter and chain driver of the present invention.

Second Automatic Bicycle Shifter Alternate Embodiment—FIG. 38.

With reference to FIG. 38, the powertrain construction of the second alternate embodiment 102 of the automatic bicycle shifter and chain driver of the present invention comprises the second alternate embodiment chain driver 114 along with pedals assembly 24 comprising aforementioned ratchet mechanism 112 and front sprockets assembly 23, rear derailleur 10, front derailleur 11, chain 19, rear sprockets assembly 20 and rear hub 21, along with all aforementioned controls components (not shown in FIG. 38) of the preferred embodiment 100 of the automatic bicycle shifter and chain driver of the present invention acting as one complete integral automatic bicycle shifter apparatus.

Second Alternate Embodiment Chain Driver—FIGS. 39 & 40.

With Reference to FIGS. 39 & 40, the second alternate embodiment 102 of the automatic bicycle shifter and chain driver of the present invention makes use of the second alternate embodiment chain driver 114 serving to preserve forward motion of chain 19 throughout all forward motion of the bicycle through a fixed connection between sprockets assembly 20 and rear hub 21 so that, notwithstanding lack of actuation of the pedals such as in instances of coasting or braking or in instances of inadvertent increase in speed such as downhill descent, necessary forward motion of chain 19 is present permitting the necessary shifting action of derailleurs 10 and 11 of the second alternate embodiment of the automatic bicycle shifter and chain driver of the present invention.

The invention claimed is:

1. An automatic bicycle shifter and chain driver apparatus comprising:
   a) a bicycle rear wheel hub derailleur powered by an electrical gearmotor including a rotational position encoder,
   b) a bicycle drive chain in constant engagement with one of a plurality of a bicycle rear wheel hub sprockets concentric to a bicycle rear wheel hub,
   c) an electronic control system including a signals processing and storage means for derailleur positional readings of said rotational position encoder corresponding to derailleur alignment positions between said rear wheel hub derailleur and said rear wheel hub sprockets,
   d) said electronic control system further including a servo motor controller with a power connection to said gearmotor,
   e) a bicycle speed sensing means producing an electric signal in a known relationship to road speed of a bicycle,
   f) an electronic user interface for saving said derailleur positional readings of said rotational position encoder and corresponding speed shifting thresholds of said bicycle into said electronic control system,
   g) a bicycle drive chain forward movement sensing means,
   h) a bicycle drive chain driver means for disengagement of said rear wheel hub sprockets from said bicycle rear wheel hub and forward actuation thereof resulting in forward movement of thereto engaged said bicycle drive chain, and
   i) a bicycle pedals ratchet means fitted for actuation of said bicycle drive chain and consequent power transmission to said rear wheel hub sprockets upon a forward actuation of bicycle pedals and a slippage action thereof upon actuation of said bicycle drive chain driver means with said bicycle pedals in a predominantly stationary state, Whereby said electronic control system commands said gearmotor through said servo motor controller to seek and hold said derailleur positional readings of said rotational position encoder upon said bicycle speed sensing means relaying said corresponding speed shifting thresholds are reached with said electronic control system, upon sensing lack of actuation of said bicycle pedals as relayed by said bicycle drive chain forward movement sensing means, forcing actuation of said bicycle drive chain driver means resulting in disengagement of said rear wheel hub sprockets from said bicycle rear wheel hub, forward actuation and consequent forward movement of said bicycle drive chain thereof as necessary for operation of said rear wheel hub derailleur with said bicycle pedals ratchet means serving to inhibit consequent power transmission thereof to said bicycle pedals and thereby achieving necessary shift operation by said rear wheel hub derailleur.

2. The automatic bicycle shifter and chain driver apparatus of claim 1 including a second bicycle drive chain derailleur alternating said bicycle drive chain between a plurality of sprockets rotationally affixed to said bicycle pedals.

3. The automatic bicycle shifter and chain driver apparatus of claim 1 including a first manual override shift up switch and a second manual override shift down switch hardwired to said electronic control system.

4. The automatic bicycle shifter and chain driver apparatus of claim 1 including a bicycle position inclinometer.

5. The automatic bicycle shifter and chain driver apparatus of claim 1 wherein said electronic user interface further includes displays for position of said rear wheel hub derailleur and speed of said bicycle.

6. The automatic bicycle shifter and chain driver apparatus of claim 1 wherein said electronic user interface is operable in a teach mode comprising a prompt window for user guidance, a display window for entry of number of said rear wheel hub sprockets, a second display window for entry of selected teaching positions, shift in and shift out buttons for positioning of said rear wheel hub derailleur into accurate alignment with said rear wheel hub sprockets, and a set button for saving taught positions of said rear wheel hub derailleur.

7. The automatic bicycle shifter and chain driver apparatus of claim 1 wherein said electronic user interface is operable in a programming mode comprising a prompt window for user guidance, a shift speed position display window, shift up and shift down buttons for manual operation of said rear wheel hub derailleur, and a set button for programming of said corresponding speed shifting thresholds.

8. The automatic bicycle shifter and chain driver apparatus of claim 1 wherein said electronic user interface is operable in an operation mode in real time including manual and automatic operation selection buttons, position override shift up and shift down buttons, an active program display, a save program button, a recall program button, and a bias touchscreen sliding control bar for attenuation of said corresponding speed shifting thresholds for said rear wheel hub derailleur.

9. The automatic bicycle shifter and chain driver apparatus of claim 1 wherein said electronic control system further includes a WIFI transceiver adapted for communication with a mobile phone running a corresponding WIFI communication application and a touchscreen application serving as said user interface.

10. An automatic bicycle shifter and chain driver apparatus comprising:
   a) a bicycle rear wheel hub derailleur powered by an electrical gearmotor including a rotational position encoder,
   b) a bicycle drive chain in constant engagement with one of a plurality of a bicycle rear wheel hub sprockets concentric to a bicycle rear wheel hub,
   c) an electronic control system including a signals processing and storage means for derailleur positional readings of said rotational position encoder corresponding to derailleur alignment positions between said rear wheel hub derailleur and said rear wheel hub sprockets,
   d) said electronic control system further including a servo motor controller with a power connection to said gearmotor,
   e) a bicycle speed sensing means producing an electric signal in a known relationship to road speed of a bicycle,
   f) an electronic user interface for saving said derailleur positional readings of said rotational position encoder and corresponding speed shifting thresholds of said bicycle into said electronic control system,
   g) said bicycle rear wheel hub including a rotationally affixed connection to said rear wheel hub sprockets necessitating forward movement of said bicycle drive chain throughout forward movement of said bicycle, and
   h) a bicycle pedals ratchet means fitted for actuation of said bicycle drive chain and consequent power transmission to said rear wheel hub sprockets upon a forward actuation of bicycle pedals and a slippage action thereof upon a forward movement of said bicycle drive chain with said bicycle pedals in a predominantly stationary state, Whereby said electronic control system commands said gearmotor through said servo motor controller to seek and hold said derailleur positional readings of said rotational position encoder upon said bicycle speed sensing means relaying said corresponding speed shifting thresholds are reached notwithstanding lack of actuation of said bicycle pedals with said rotationally affixed connection forcing continual forward movement of said rear wheel hub sprockets and consequent forward movement of said bicycle drive chain throughout forward movement of said bicycle thereby facilitating necessary shift operation by said rear wheel hub derailleur with said bicycle pedals ratchet means serving to inhibit consequent power transmission thereof to said bicycle pedals.

11. The automatic bicycle shifter and chain driver apparatus of claim 10 including a second bicycle drive chain derailleur alternating said bicycle drive chain between a plurality of sprockets rotationally affixed to said bicycle pedals.

12. The automatic bicycle shifter and chain driver apparatus of claim 10 wherein said electronic control system further includes a WIFI transceiver adapted for communication with a mobile phone running a corresponding WIFI communication application and a touchscreen application serving as said user interface.

13. The automatic bicycle shifter and chain driver apparatus of claim 10 wherein said electronic user interface is operable in a teach mode comprising a prompt window for user guidance, a display window for entry of number of said rear wheel hub sprockets, a second display window for entry of selected teaching positions, shift in and shift out buttons for positioning of said rear wheel hub derailleur into accurate alignment with said rear wheel hub sprockets, and a set button for saving taught positions of said rear wheel hub derailleur.

14. The automatic bicycle shifter and chain driver apparatus of claim 10 wherein said electronic user interface is operable in a programming mode comprising a prompt window for user guidance, a shift speed position display window, a program selection button, shift up and shift down buttons for manual operation of said rear wheel hub derailleur, and a set button for programming of said corresponding speed shifting thresholds.

15. The automatic bicycle shifter and chain driver apparatus of claim 10 wherein said electronic user interface is operable in an operation mode in real time including manual and automatic operation selection buttons, position override shift up and shift down buttons, an active program display, a save program button, a recall program button, and a bias touchscreen sliding control bar for attenuation of said corresponding speed shifting thresholds for said rear wheel hub derailleur.

16. An automatic bicycle shifter and chain driver apparatus comprising:
   a) a bicycle rear wheel hub derailleur powered by an electrical gearmotor including a rotational position encoder,
   b) a bicycle drive chain in constant engagement with one of a plurality of a bicycle rear wheel hub sprockets concentric to a bicycle rear wheel hub,
   c) an electronic control system including a signals processing and storage means for derailleur positional readings of said rotational position encoder corresponding to derailleur alignment positions between said rear wheel hub derailleur and said rear wheel hub sprockets,
   d) said electronic control system further including a servo motor controller with a power connection to said gearmotor,
   e) a bicycle speed sensing means producing an electric signal in a known relationship to road speed of a bicycle,
   f) an electronic user interface for saving said derailleur positional readings of said rotational position encoder and corresponding speed shifting thresholds of said bicycle into said electronic control system,
   g) a bicycle drive chain forward movement sensing means,
   h) said bicycle rear wheel hub further slaved to a pawl and ratchet assembly through attachment to a ratchet hub thereof embodying a plurality of ratchet pockets and internally housing a rotating pawl hub fitted with a corresponding plurality of pivoting pawls urged in the outward radial direction by means of a corresponding plurality of springs,
   i) said rotating pawl hub further including an axial extension internally secured to said rear wheel hub sprockets,
   j) said plurality of pivoting pawls further adapted for engagement with said plurality of ratchet pockets upon forward actuation of bicycle pedals, resultant forward movement of said bicycle drive chain and consequent forward rotation of said rear wheel hub sprockets,
   k) a chain driver including an electrical chain driver motor slaved to said electronic control system, a thereto connected chain driver gearset affixed to a chain driver cam hub internally slip fit to said rotating pawl hub and affixed on opposing end thereof to a cam cup embodying a plurality of intermittent cams corresponding to said plurality of pivoting pawls and fitted for urging collapse thereof in the inward radial direction through engagement with corresponding outer peripheries thereof upon actuation of said chain driver motor, l) said cam cup further embodying a plurality of circular cam slots adapted for engagement by a corresponding plurality of protruding pins press fit into said rotating pawl hub and limiting relative rotation thereof with said plurality of protruding pins further retaining hook ends of a corresponding plurality of extension springs urging disengagement of said plurality of intermittent cams with said plurality of pivoting pawls through retention of opposite hook ends thereof by a matching plurality of return pins press fit into said cam cup, and m) a bicycle pedals ratchet means fitted for actuation of said bicycle drive chain and consequent power transmission to said rear wheel hub sprockets upon a forward actuation of a bicycle pedals and a slippage action thereof upon actuation of said chain driver with said bicycle pedals in a predominantly stationary state, Whereby said electronic control system commands said gearmotor through said servo motor controller to seek and hold said derailleur positional readings of said rotational position encoder upon said bicycle speed sensing means relaying said corresponding speed shifting thresholds are reached with simultaneous lack of actuation of said bicycle pedals thereof resulting in said bicycle drive chain forward movement sensing means relaying a corresponding signal to said electronic control system which in turn energizes said chain driver motor forcing rotation of said cam cup with said plurality of intermittent cams thereby forcing collapse of said plurality of pivoting pawls and thereby disengagement of said rear wheel hub sprockets from said bicycle rear wheel hub with further rotation of said cam cup resulting in said plurality of circular cam slots reaching the end of their relative rotation to said rotating pawl hub forcing rotation thereof along with thereto secured said rear wheel hub sprockets forcing forward movement of said bicycle drive chain with said bicycle pedals ratchet means serving to inhibit resultant power transmission to said bicycle pedals, followed by said electronic control system energizing said gearmotor thereby conducting necessary shift operation followed by cessation of actuation of said chain driver motor resulting in disengagement of said plurality of intermittent cams with said plurality of pivoting pawls under the action of said plurality of extension springs, and consequent re-engagement of said rotating pawl hub with said ratchet hub upon forward actuation of said bicycle pedals with said rear wheel hub derailleur in the proper position, in turn permitting operation of said bicycle pedals.

17. The automatic bicycle shifter and chain driver apparatus of claim 16 including a second bicycle drive chain derailleur alternating said bicycle drive chain between a plurality of sprockets rotationally affixed to said bicycle pedals.

18. The automatic bicycle shifter and chain driver apparatus of claim 16 wherein said electronic control system further includes a WIFI transceiver adapted for communication with a mobile phone running a corresponding WIFI communication application and a touchscreen application serving as said user interface.

19. The automatic bicycle shifter and chain driver apparatus of claim 16 wherein said electronic user interface is operable in a teach mode comprising a prompt window for user guidance, a display window for entry of number of said rear wheel hub sprockets, a second display window for entry of selected teaching positions, shift in and shift out buttons for positioning of said rear wheel hub derailleur into accurate alignment with said rear wheel hub sprockets, and a set button for saving taught positions of said rear wheel hub derailleur.

20. The automatic bicycle shifter and chain driver apparatus of claim 16 wherein said electronic user interface is operable in a programming mode comprising a prompt window for user guidance, a shift speed position display window, a program selection button, shift up and shift down buttons for manual operation of said rear wheel hub derailleur, and a set button for programming of said corresponding speed shifting thresholds.

21. The automatic bicycle shifter and chain driver apparatus of claim 16 wherein said electronic user interface is operable in an operation mode in real time including manual and automatic operation selection buttons, position override shift up and shift down buttons, an active program display, a save program button, a recall program button, and a bias touchscreen sliding control bar for attenuation of said corresponding speed shifting thresholds for said rear wheel hub derailleur.

22. An automatic bicycle shifter and chain driver apparatus comprising:

a) a bicycle rear wheel hub derailleur powered by an electrical gearmotor including a rotational position encoder, b) a bicycle drive chain in constant engagement with one of a plurality of a bicycle rear wheel hub sprockets concentric to a bicycle rear wheel hub, c) an electronic control system including a signals processing and storage means for derailleur positional readings of said rotational position encoder corresponding to derailleur alignment positions between said rear wheel hub derailleur and said rear wheel hub sprockets, d) said electronic control system further including a servo motor controller with a power connection to said gearmotor, e) a bicycle speed sensing means producing an electric signal in a known relationship to road speed of a bicycle, f) an electronic user interface for saving said derailleur positional readings of said rotational position encoder and corresponding speed shifting thresholds of said bicycle into said electronic control system, g) a bicycle drive chain forward movement sensing means, h) said bicycle rear wheel hub further slaved to a pawl and ratchet assembly through attachment to a ratchet hub thereof embodying a plurality of ratchet pockets and internally housing a rotating pawl hub fitted with a corresponding plurality of guided pawls of predominantly circular midsections, urged in outward radial direction by means of a corresponding plurality of pawl springs and adapted for engagement with said plurality of ratchet pockets, i) said rotating pawl hub further including a radial extension retaining said plurality of guided pawls between mating concentric circular peripheries of a corresponding plurality of axial inner and outer gib extensions including mating features limiting inward and outward radial movement of said plurality of guided pawls and embodying said corresponding plurality of pawl springs, and an axial extension internally secured to said rear wheel hub sprockets, j) said plurality of guided pawls further adapted for engagement with said plurality of ratchet pockets upon forward actuation of a bicycle pedals, resultant forward movement of said bicycle drive chain and consequent forward rotation of said rear wheel hub sprockets, k) a chain driver including an electrical chain driver motor slaved to said electronic control system, a thereto connected chain driver gearset affixed to a chain driver cam hub internally slip fit to said rotating pawl hub and including a radial extension embodying a plurality of radial cams serving to draw said plurality of guided pawls in the inward radial direction through respective contact with mating recessed features thereof, in turn forcing corresponding rotation of said plurality of guided pawls, said rotating pawl hub and thereto retained said rear wheel hub sprockets upon said plurality of guided pawls reaching the end of their respective inward radial travel thereof, and l) a bicycle pedals ratchet means fitted for actuation of said bicycle drive chain and consequent power transmission to said rear wheel hub sprockets upon a forward actuation of a bicycle pedals and a slippage action thereof upon actuation of said chain driver with said bicycle pedals in a predominantly stationary state, Whereby said electronic control system commands said gearmotor through said servo motor controller to seek and hold said derailleur positional readings of said rotational position encoder upon said bicycle speed sensing means relaying said corresponding speed shifting thresholds are reached with simultaneous lack of actuation of said bicycle pedals thereof resulting in said bicycle drive chain forward movement sensing means relaying a corresponding signal to said electronic control system which in turn, energizes said chain driver motor forcing rotation of said cam hub, said plurality of radial cams serving to draw said plurality of guided pawls in the inward radial direction resulting in disengagement of said rear wheel hub sprockets from said rear wheel hub and with further rotation of said cam hub forcing rotation of said rotating pawl hub and thereto retained rear wheel hub sprockets, forward movement of said bicycle drive chain with said bicycle pedals ratchet means serving to inhibit resultant power transmission to said bicycle pedals, followed by said electronic control system energizing said gearmotor thereby conducting necessary shift operation followed by cessation of actuation of said chain driver motor resulting in return of said plurality of guided pawls to engagement positions of said ratchet hub under the action of said pawl springs, and consequent re-engagement of said rotating pawl hub with said ratchet hub upon forward actuation of said bicycle pedals with said rear wheel hub derailleur in the proper position, in turn permitting operation of said bicycle pedals.

23. The automatic bicycle shifter and chain driver apparatus of claim 22 including a second bicycle drive chain derailleur alternating said bicycle drive chain between a plurality of sprockets rotationally affixed to said bicycle pedals.

24. The automatic bicycle shifter and chain driver apparatus of claim 22 wherein said electronic control system further includes a WIFI transceiver adapted for communication with a mobile phone running a corresponding WIFI communication application and a touchscreen application serving as said user interface.

25. The automatic bicycle shifter and chain driver apparatus of claim 22 wherein said electronic user interface is operable in a teach mode comprising a prompt window for user guidance, a display window for entry of number of said rear wheel hub sprockets, a second display window for entry of selected teaching positions, shift in and shift out buttons for positioning of said rear wheel hub derailleur into accurate alignment with said rear wheel hub sprockets, and a set button for saving taught positions of said rear wheel hub derailleur.

26. The automatic bicycle shifter and chain driver apparatus of claim 22 wherein said electronic user interface is operable in a programming mode comprising a prompt window for user guidance, a shift speed position display window, a program selection button, shift up and shift down buttons for manual operation of said rear wheel hub derailleur, and a set button for programming of said corresponding speed shifting thresholds.

27. The automatic bicycle shifter and chain driver apparatus of claim 22 wherein said electronic user interface is operable in an operation mode in real time including manual and automatic operation selection buttons, position override shift up and shift down buttons, an active program display, a save program button, a recall program button, and a bias touchscreen sliding control bar for attenuation of said corresponding speed shifting thresholds for said rear wheel hub derailleur.

* * * * *